May 26, 1970    J. H. WILSON    3,513,988
AUTOMATIC DRILL STEM AND PIPE POSITIONER DEVICE
Filed April 24, 1967    14 Sheets-Sheet 13
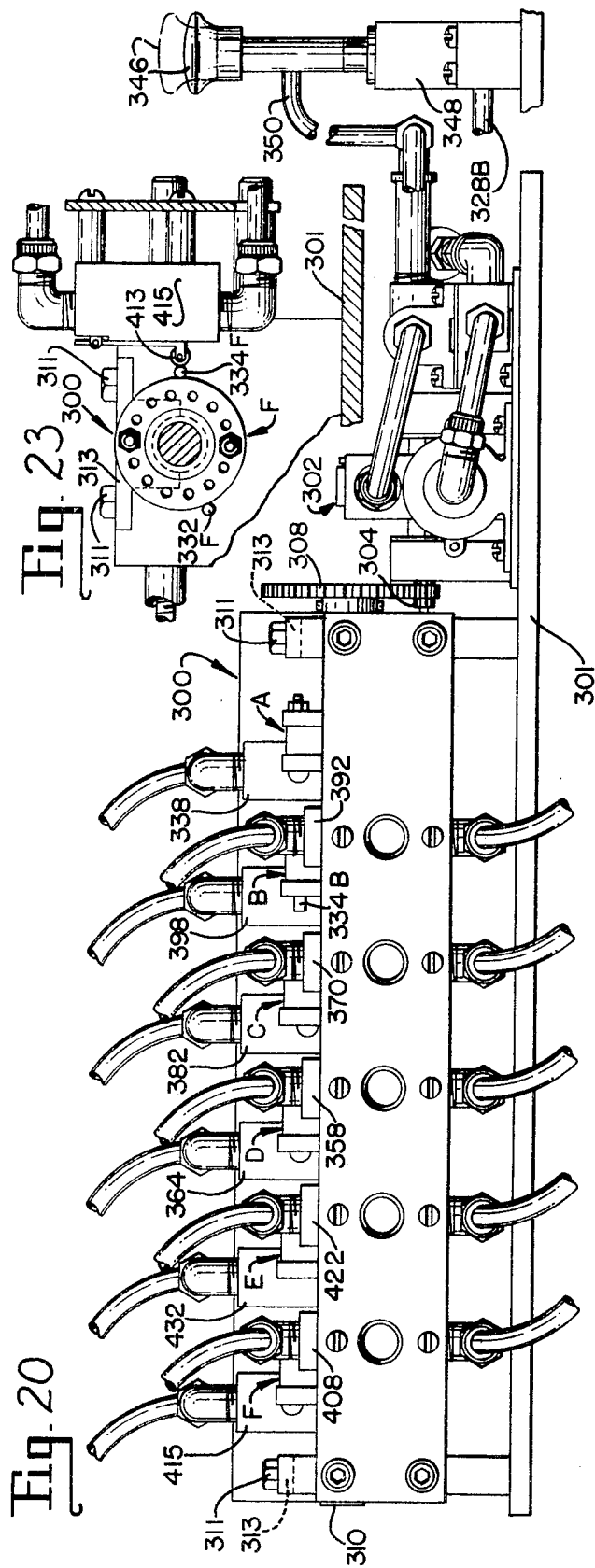
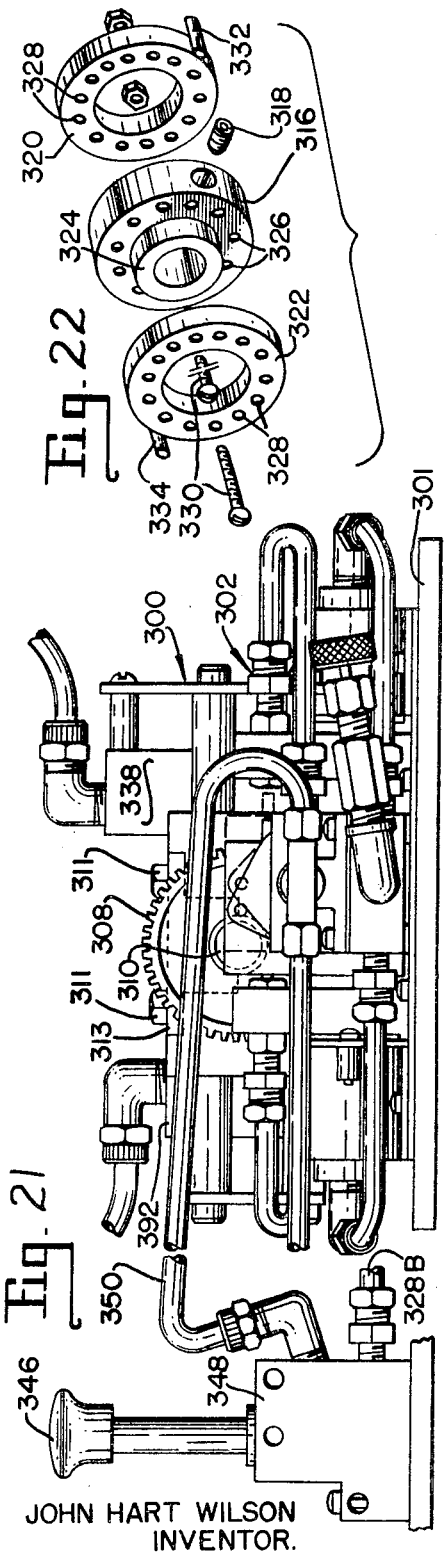
JOHN HART WILSON
INVENTOR.
BY *Wayland D. Keith*
HIS AGENT

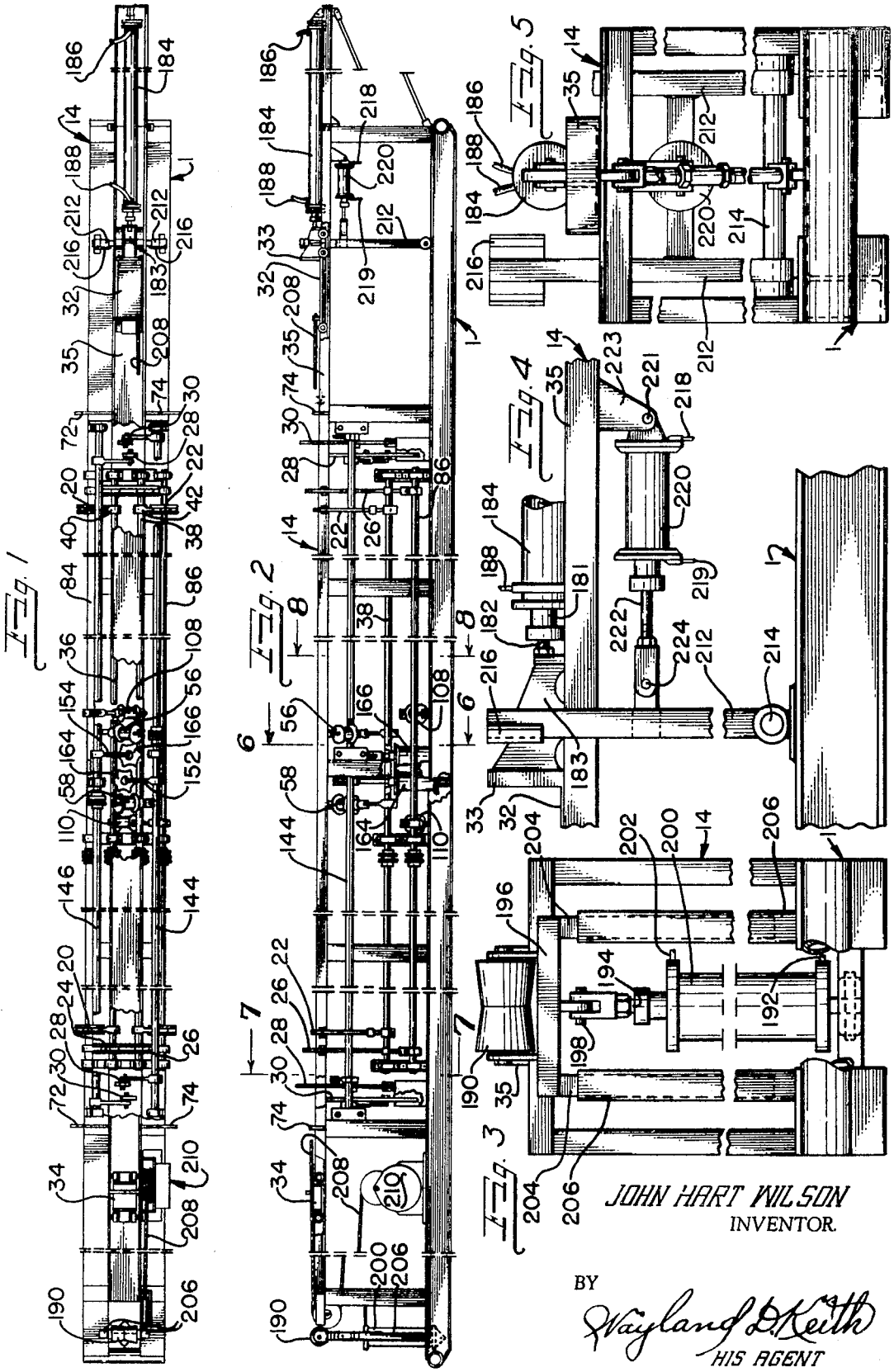

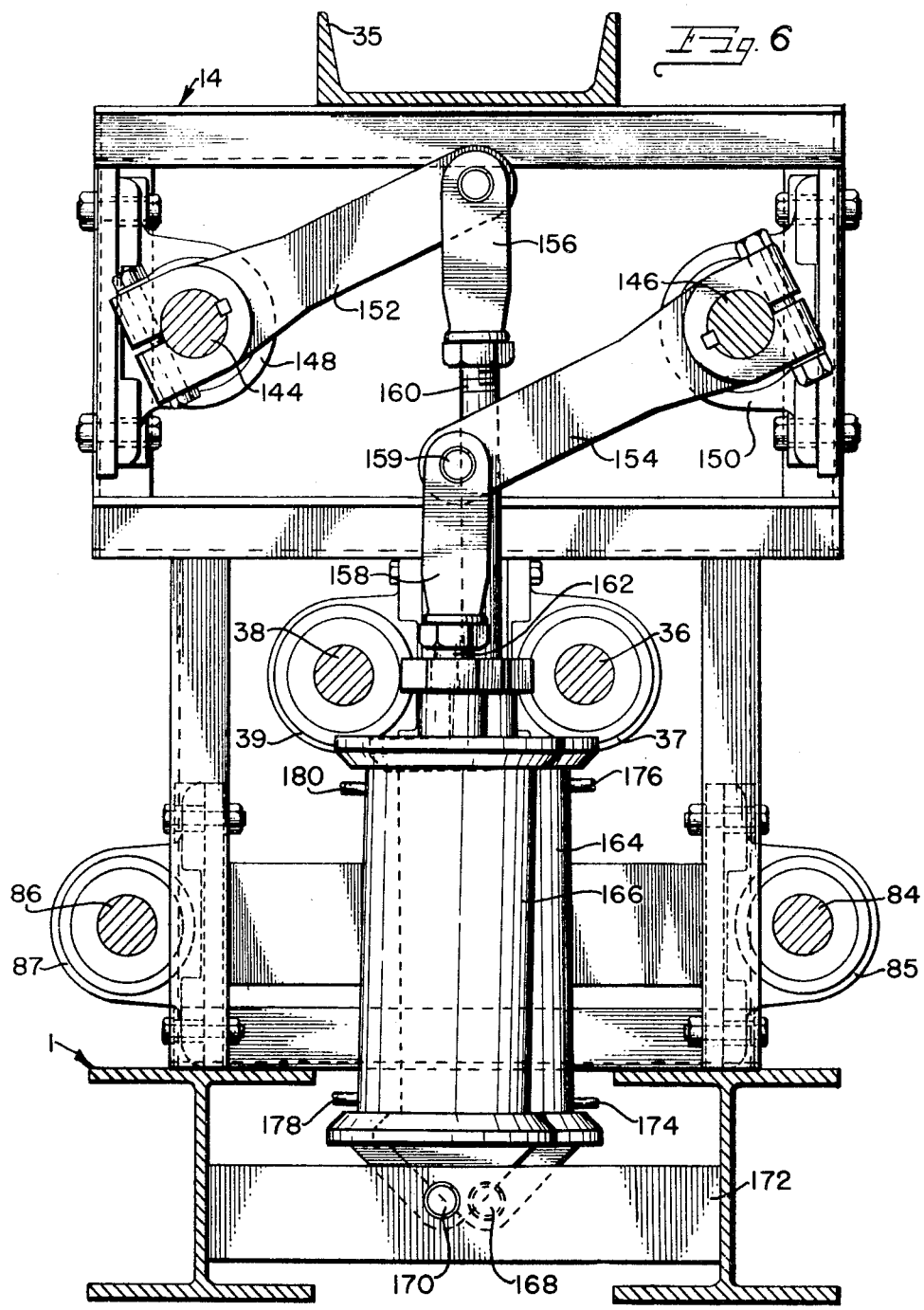

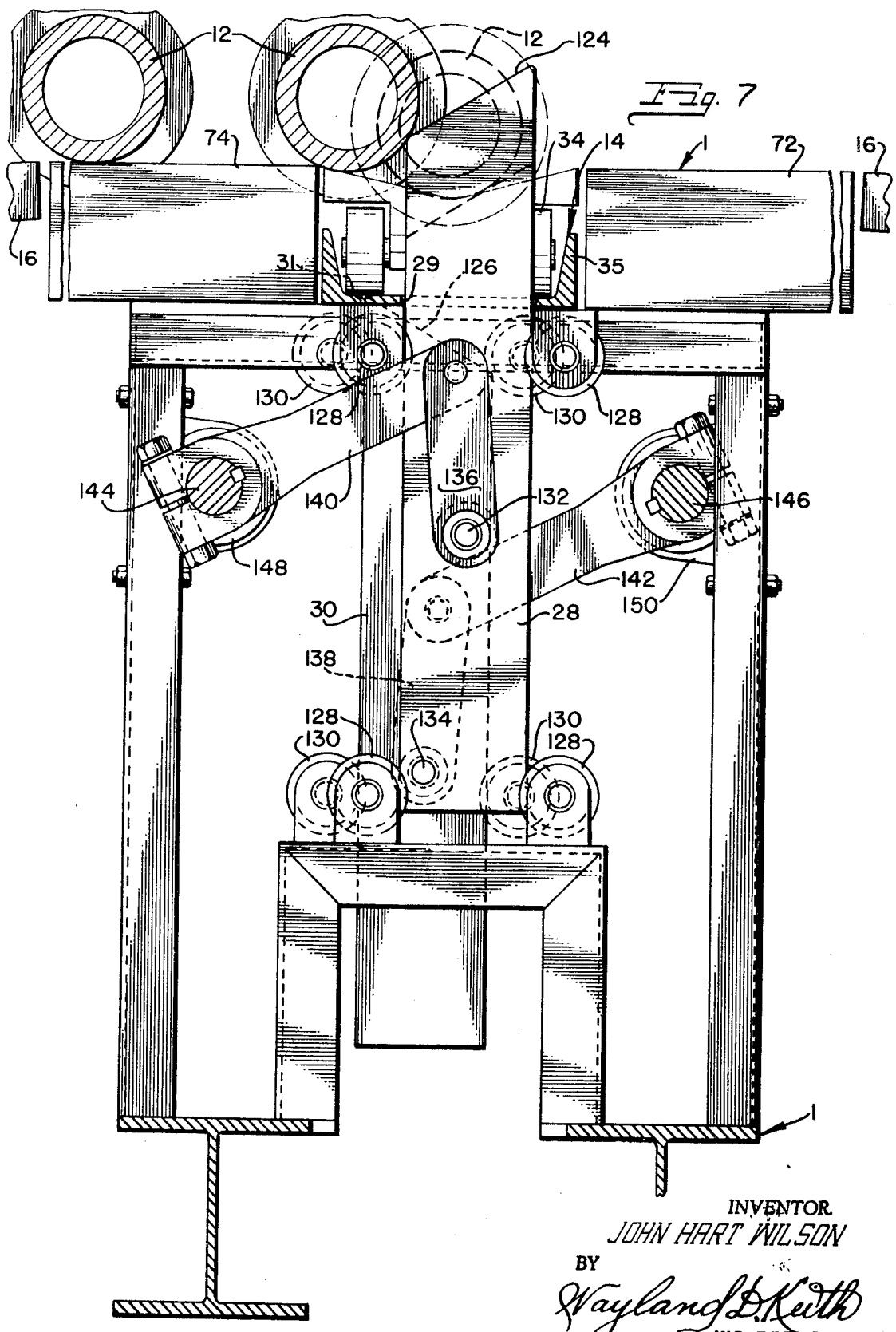

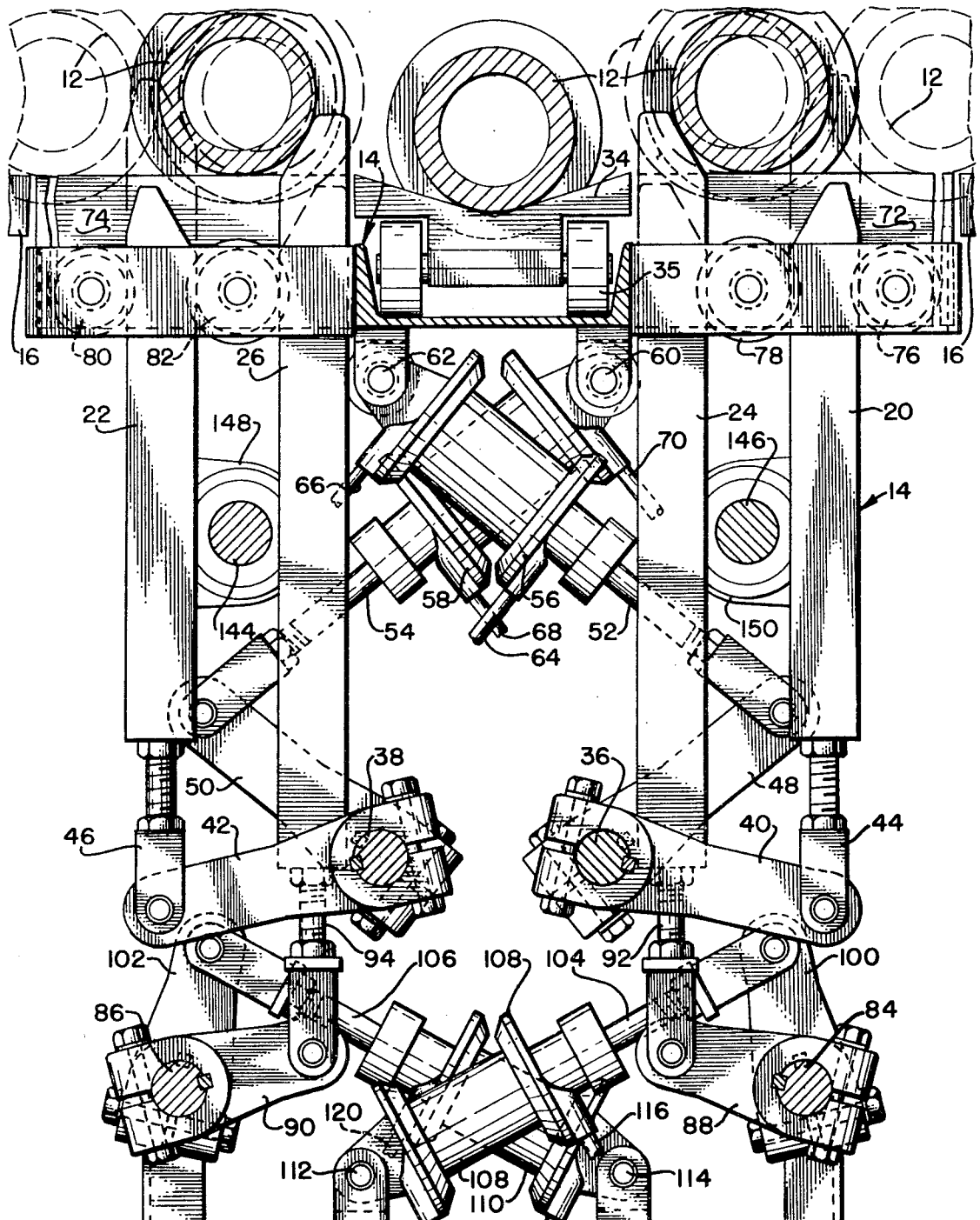

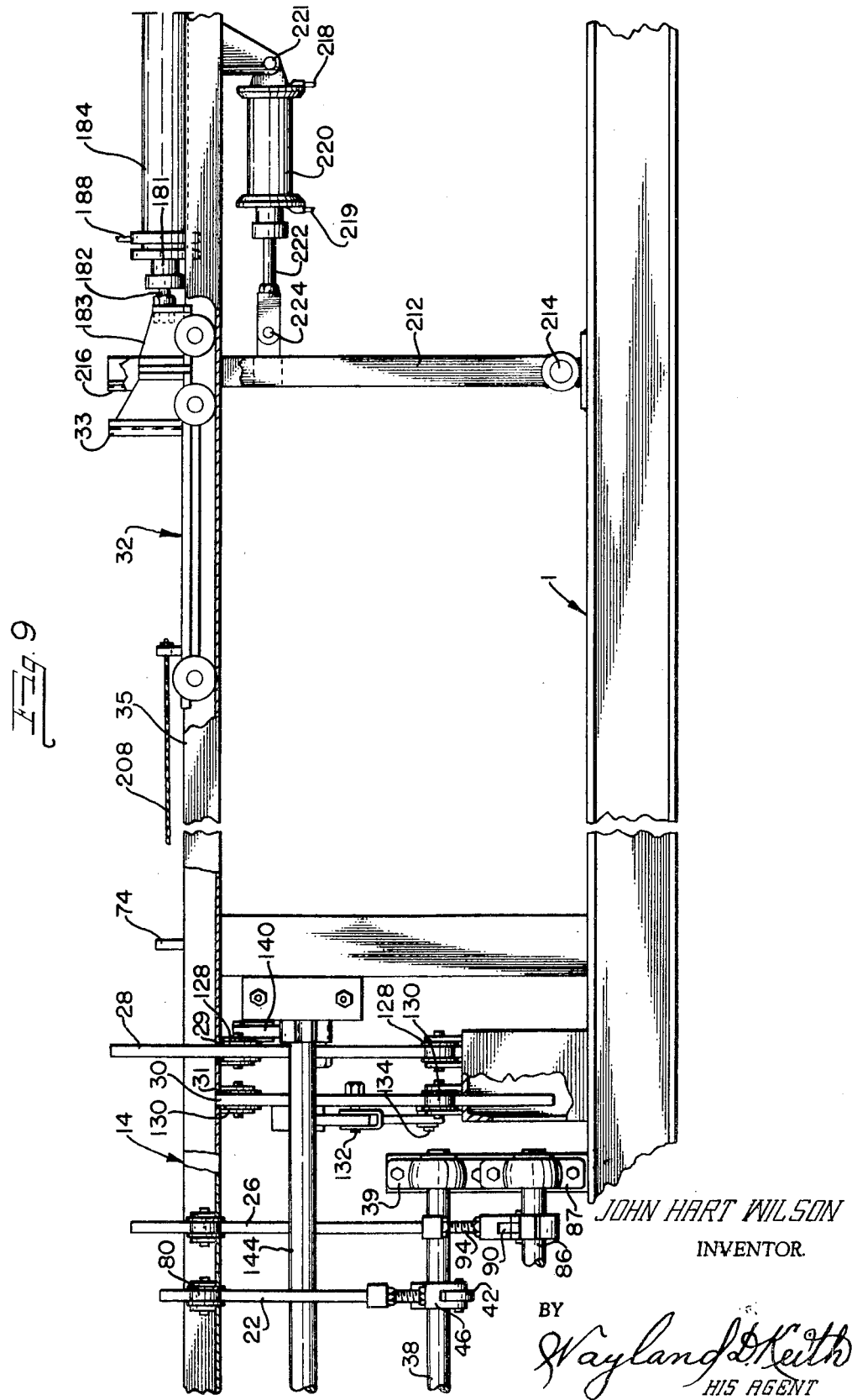

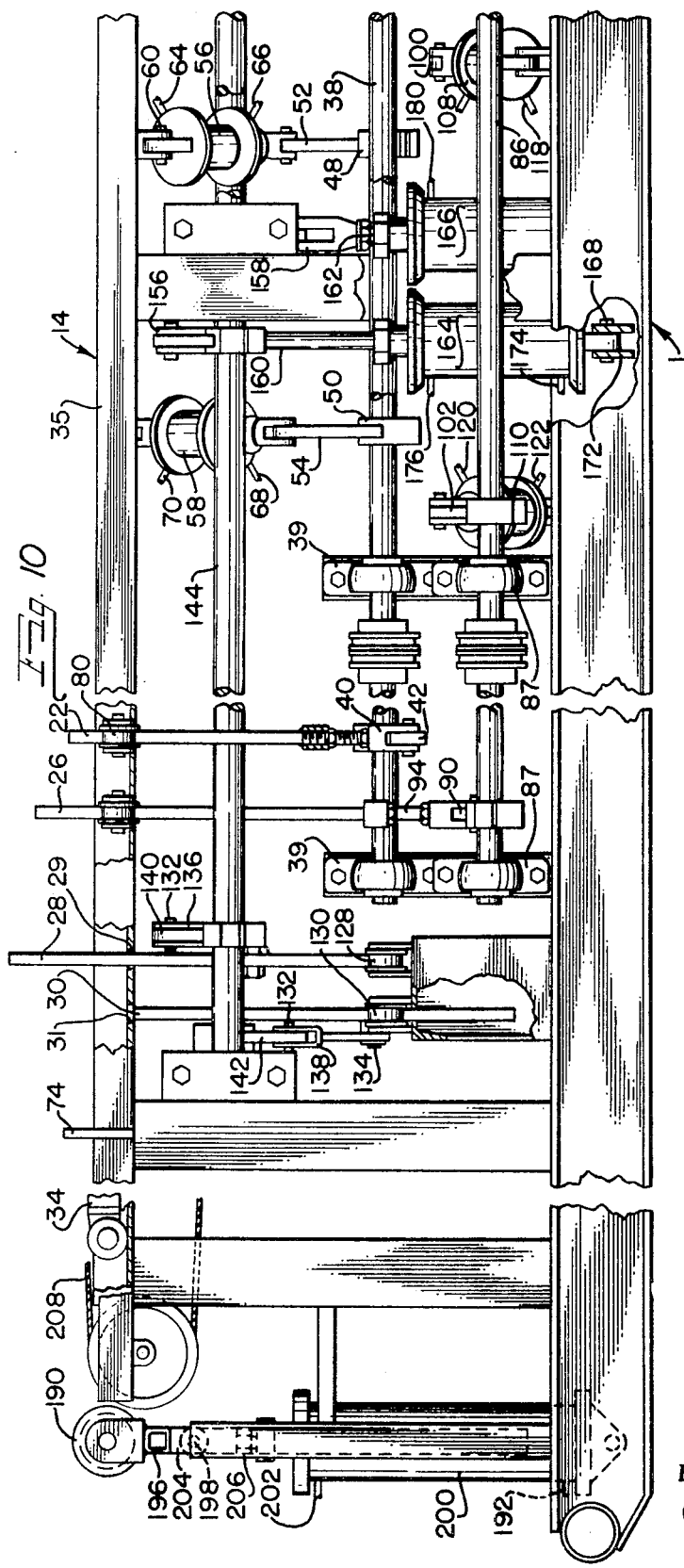

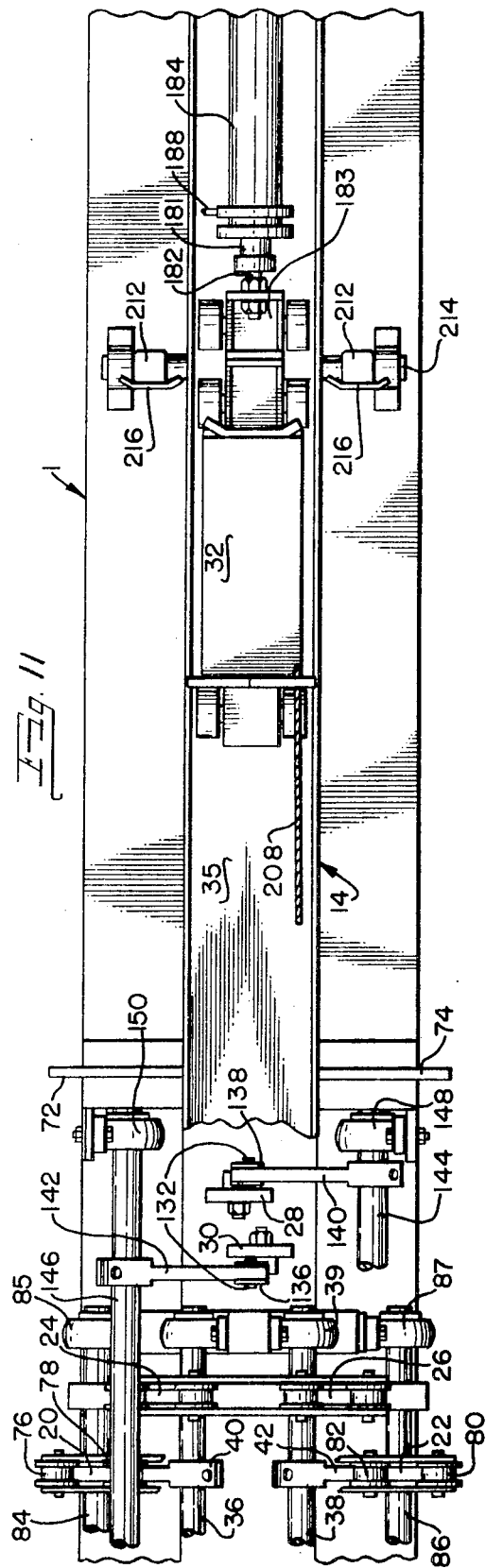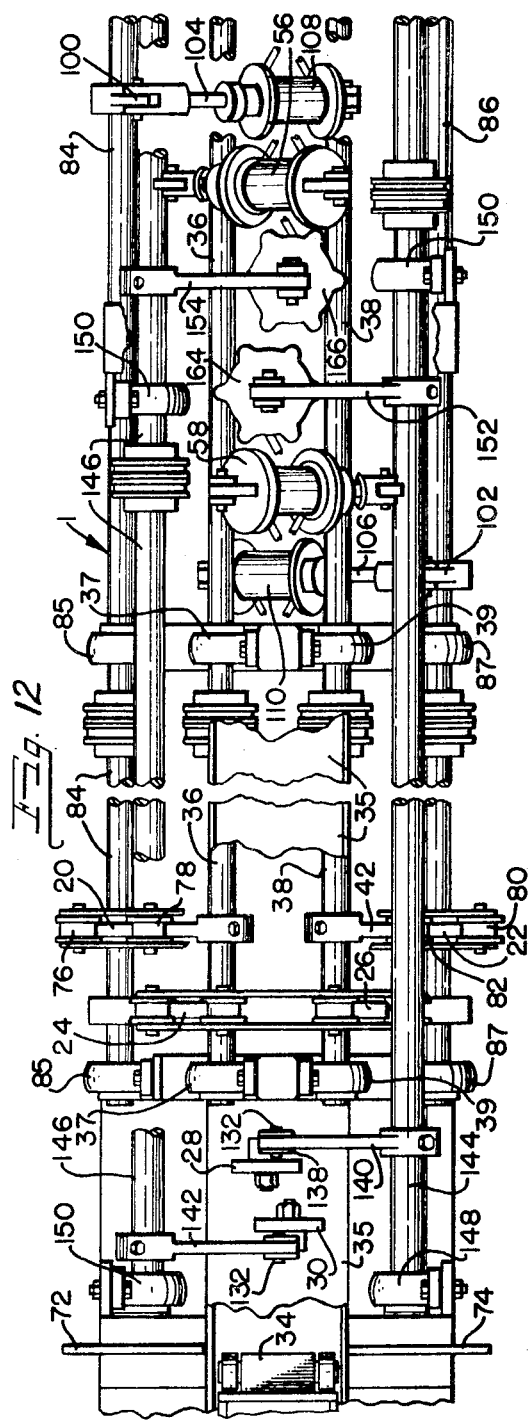

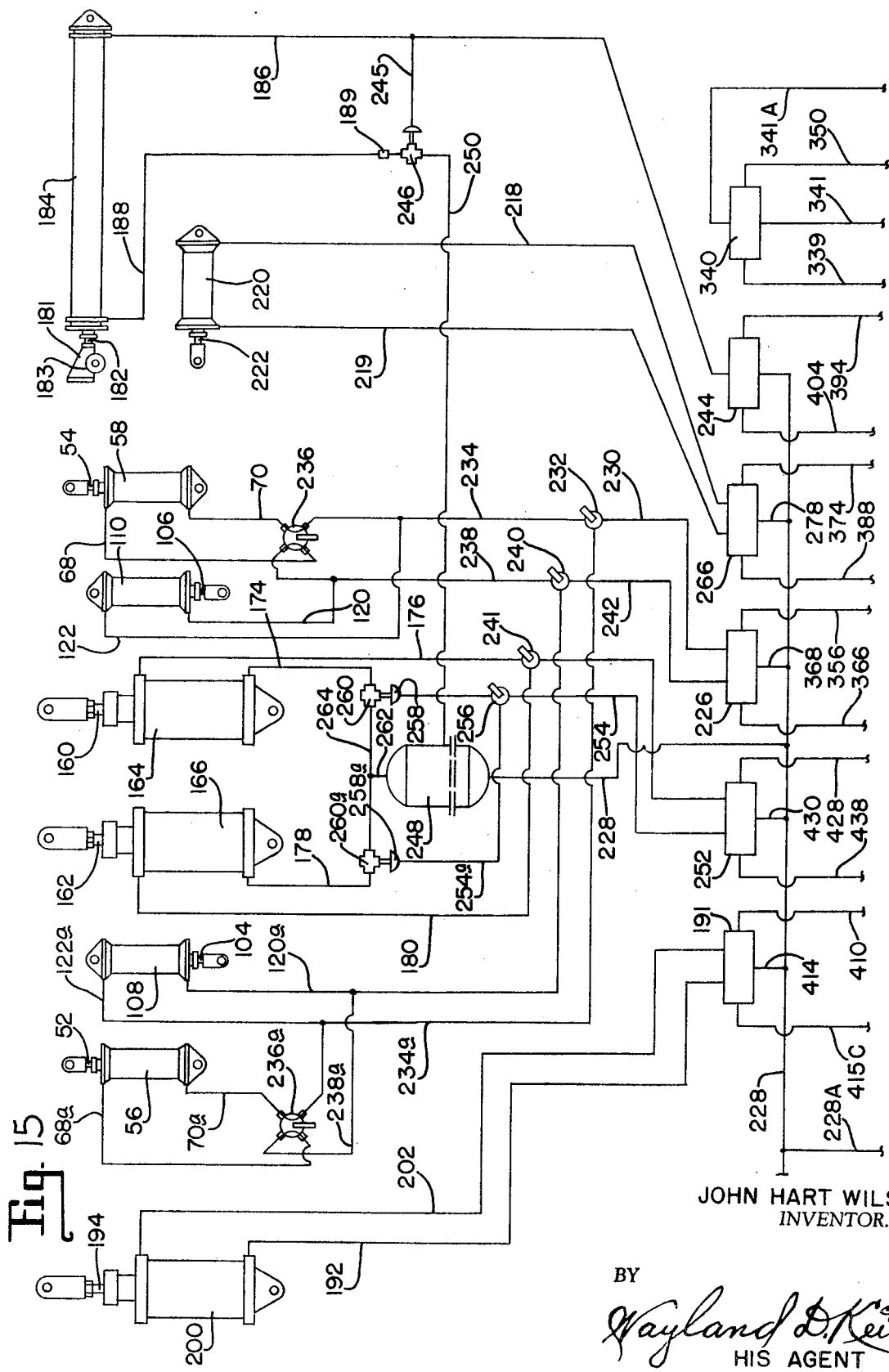

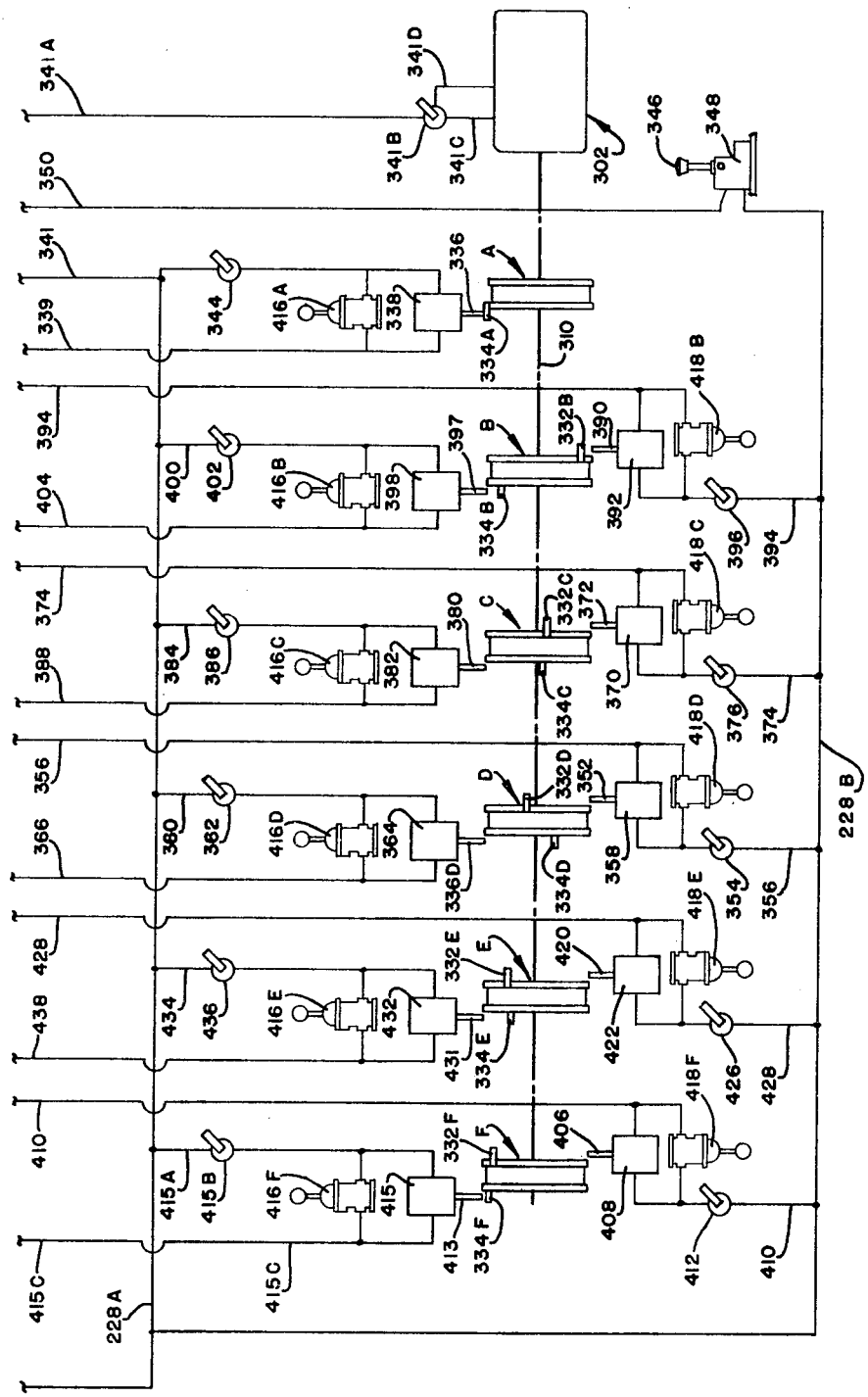

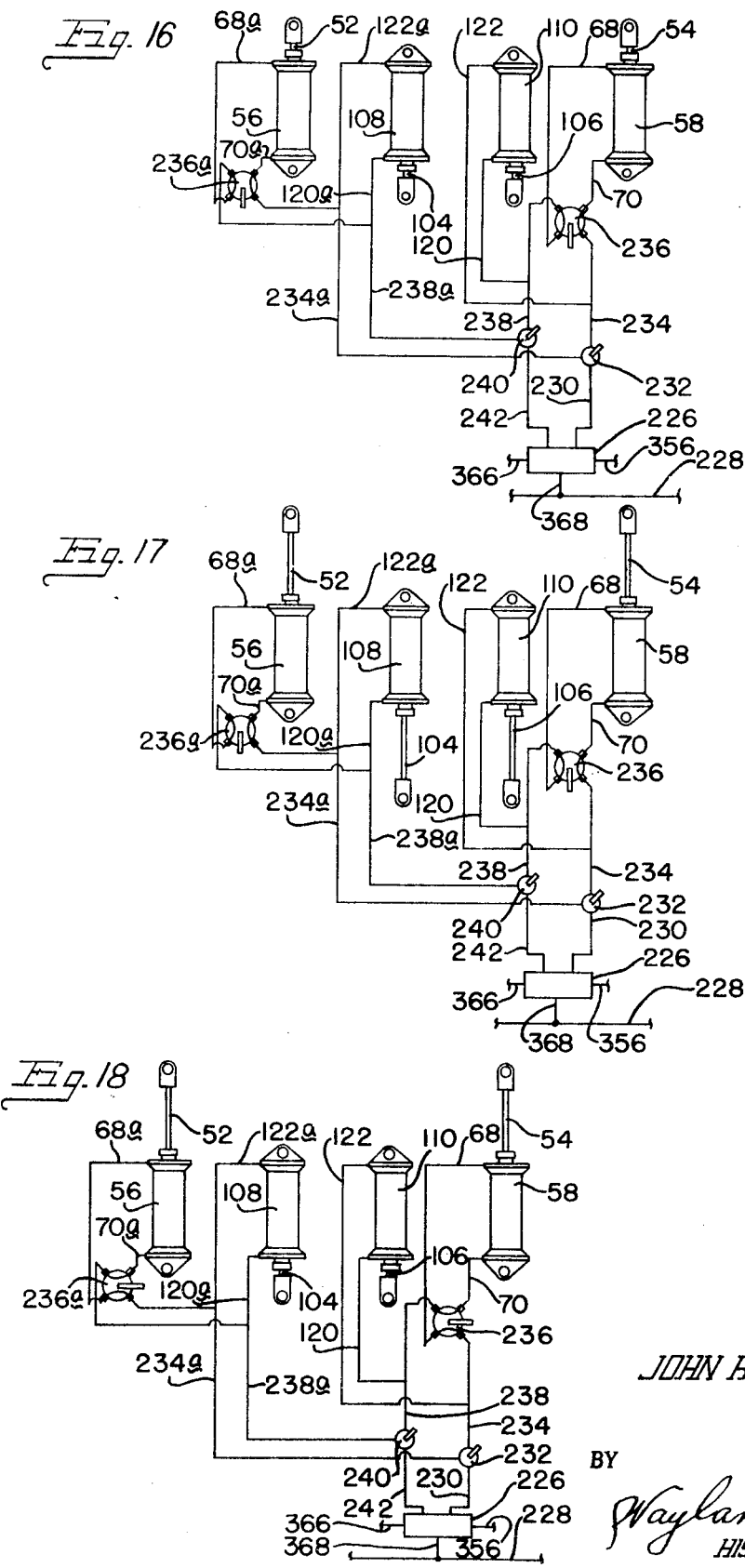

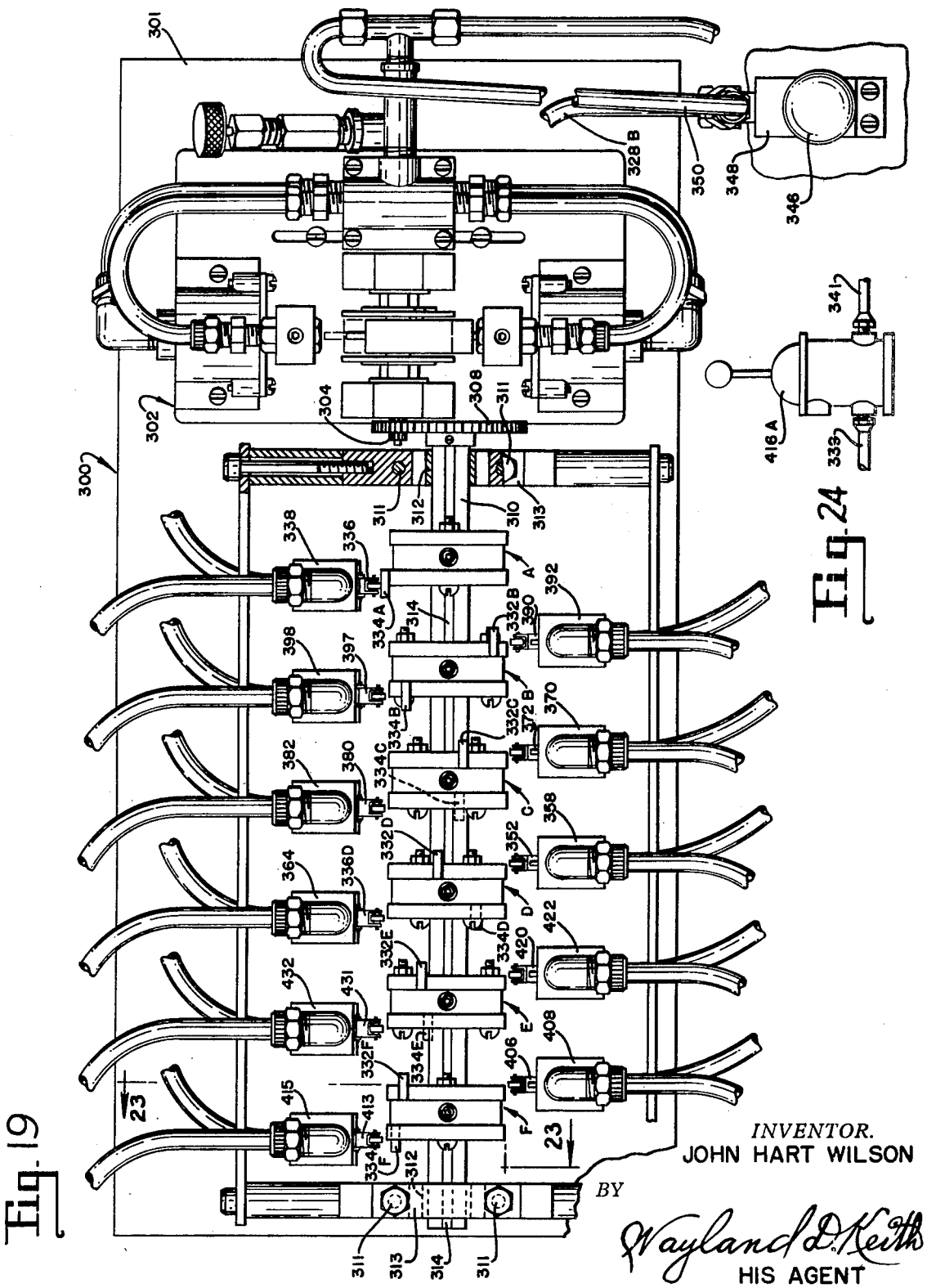

JOHN HART WILSON
INVENTOR.

BY
Wayland D. Keith
HIS AGENT

United States Patent Office 3,513,988
Patented May 26, 1970

3,513,988
AUTOMATIC DRILL STEM AND PIPE
POSITIONER DEVICE
John Hart Wilson, c/o Wilson Manufacturing Company,
P.O. Box 1031, Wichita Falls, Tex. 76307
Continuation-in-part of application Ser. No. 492,581,
Oct. 4, 1965. This application Apr. 24, 1967, Ser.
No. 633,232
The portion of the term of the patent subsequent to
Apr. 25, 1984, has been disclaimed
Int. Cl. B65g 69/00
U.S. Cl. 214—1
8 Claims

ABSTRACT OF THE DISCLOSURE

A device for moving drill stem or pipe transversely off a pipe hauling and dispensing apparatus onto a wheeled carrier in programmed, automated relation, moving the drill stem or pipe longitudinally on wheeled carriers to an elevating cylinder, automatically elevating the end of the drill stem or pipe adjacent the drilling rig to enable the connection of elevators thereto. The sequence is initiated by manually operating an air valve. Upon completion of the operation of going into the hole, the cams are either reset for use in withdrawing drill stem or pipe from the hole, or replaced, by quick change means, and a programmed cam shaft placed in the mechanism so upon lowering the drill stem upon the wheeled carrier, the ends of the pipe will be evened and dispensed laterally by kicker bars, in timed sequence. Provision is made for eliminating such stations as are not used.

This application is a continuation-in-part of my application Ser. No. 492,581, filed Oct. 4, 1965, for Drill Stem and Pipe Positioner Device, now Pat. No. 3,315,822, issued Apr. 25, 1967.

This invention relates to a pipe and drill stem positioner for receiving pipe and drill stem transversely thereonto from either side thereof, and positioning the pipe or drill stem longitudinally in such manner that it may be efficiently and expeditiously handled by a pipe handling device, such as pickup elevators or the like, such as used with drilling rigs, and more particularly semi-automated drilling rigs such as disclosed in my co-pending application, Ser. No. 420 293, filed Dec. 22, 1964, now Pat. No. 3,340,983, issued Sept. 12, 1967.

The present invention is so constructed that it may be secured to a trailer which is constructed for hauling pipe and for dispensing pipe thereonto and therefrom, such as shown in my co-pending application, Pipe Hauling and Dispensing Apparatus, filed Oct. 4, 1965, Ser. No. 492,580, now Pat. No. 3,365,085 issued Jan. 23, 1968, and which efficiently operates in conjunction therewith.

The present pipe positioning device comprises a longitudinal frame which is of greater length than the length of the pipe or drill stem being handled, which device has mechanism for moving the drill stem or pipe transversely of the longitudinal frame onto wheeled carriers, which wheeled carriers are positioned on a longitudinal trackway which is mounted centrally of the longitudinal frame. The mechanism is also capable of moving drill stem or pipe, which is positioned on the wheeled carriers, transversely of the longitudinal frame, onto a pipe rack or the like on either side of the pipe positioning device.

The present longitudinal frame has a plurality of longitudinally positioned, horizontal shafts journaled thereon, which shafts are operated through an arcuate movement by fluid actuated cylinders, levers and links, so as to perform the various functions of moving the pipe transversely onto or transversely off of the pipe positioner frame, and for moving the pipe onto carriers positioned on a trackway for movement longitudinally along the frame, either for removing pipe from a well and positioning it on a pipe rack to be selectively moved from the pipe rack, or pipe hauling and dispensing apparatus onto the pipe positioner, and then moved inward to be received by a pipe handling elevator of a rotary drilling rig or the like.

The present pipe and drill stem positioning device also is so programmed that the various operations will be performed in a pattern so as to obviate any mal-functions or out of sequence operation as might be caused by human operation, that is an operation without normal sequence. The automated programmed control is motor-operated preferably by a variable speed motor which may be electrical or fluid operated, which has a plurality of cams to perform the various operations that are normally manually performed by operating valves in the invention as described above.

An object of this invention is to provide a mechanism for mechanically moving pipe transversely from a pipe rack or from a pipe hauling and dispensing apparatus onto the pipe positioner, them moving the pipe longitudinally to a predetermined point to enable the pipe or drill stem to be selectively engaged by a pipe handling elevator.

Still another object of the invention is to provide a pipe positioning device, which enables pipe or drill stem to be dispensed thereonto and then mechanically dispensed laterally therefrom onto a pipe receiving rack or onto a pipe hauling and dispensing apparatus until all pipe has been withdrawn from a well.

Still another object of the invention is to provide a pipe positioning device which is fluid actuated, and which may be selectively controlled from a remote position, to direct the pipe either onto a pipe hauling and dispensing apparatus or pipe rack, or, from the pipe rack or from the pipe hauling and dispensing apparatus onto the pipe positioning device.

Still another object of the invention is to provide a pipe positioning device which has a longitudinally movable carrier thereon, the movement of which carrier is fluid actuated.

Another object of the invention is to provide a pipe positioning device which has a fluid actuated device thereon, which fluid actuated device will even the ends of the pipe uniformly, when removing the pipe from a pipe rack or pipe hauling and dispensing apparatus onto the pipe positioning device.

Still a further object of the invention is to provide a pipe positioning device which has a fluid actuated elevator thereunder to selectively raise an end of a length of pipe or drill stem, thereby to enable a pipe handling elevator to be attached thereto.

Still another object of the invention is to provide a pipe positioning device which is efficient and positive in operation, and which is easy to operate.

Another object of the invention is to provide a motor operated programming apparatus to actuate the various fluid control valves in proper timed sequence so as to enable the pipe and drill stem positioning device to be so operated that each operation will fall in proper timed sequence.

And still another object of the invention is to provide an automated programming device to operate a plurality of cams which in turn will operate pilot valves to sequentially operate the control valves which control valves direct fluid to the various fluid actuated cylinders in proper timed sequence.

With these objects in view and others which will become manifest as the description proceeds, reference is to be had to the accompanying drawings in which like reference characters designate like parts in the several views thereof, in which:

FIG. 1 is at top plan view of the pipe positioning device, with parts broken away and parts removed, and showing the operating elements of the device;

FIG. 2 is a side elevation of the pipe positioning device with parts broken away and removed, with the device being shown on substantially the same scale as shown in FIG. 1;

FIG. 3 is an end elevational view of the pipe positioning device, on an enlarged scale, with parts broken away and shortened and shown in section to bring out the details of construction;

FIG. 4 is a fragmentary side elevational view of a portion of the mechanism of the pipe positioner device, with parts being broken away and shortened to bring out the details of construction;

FIG. 5 is an end elevational view, on an enlarged scale, taken from the opposite end as that shown in FIG. 3, with parts broken away and shortened to bring out the details of construction;

FIG. 6 is a sectional view taken on line 6—6 of FIG. 2, looking in the direction indicated by the arrows and being on a greatly enlarged scale with respect to FIGS. 1 through 5;

FIG. 7 is a sectional view taken on line 7—7 of FIG. 2, looking in the direction indicated by the arrows, and being on a scale substantially the same as that of FIG. 6, with parts being broken away and shortened, and with parts shown in full and dashed outline to indicate movement of the respective parts and of the drill stem, as the device is actuated.

Figure 13:
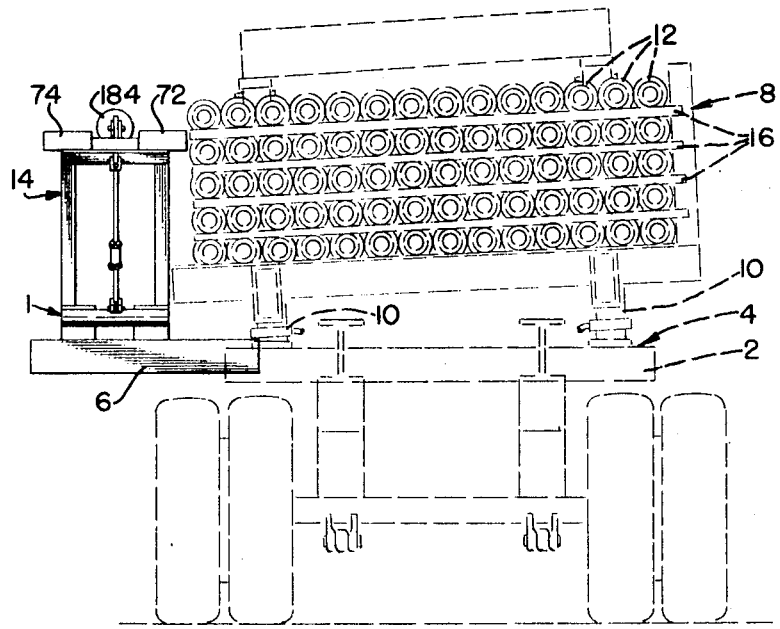
Figure 14:
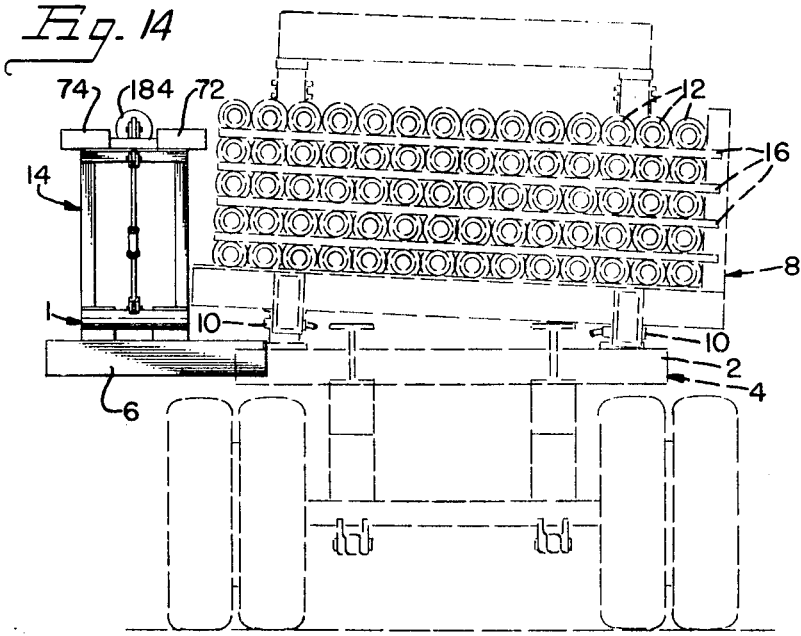
Figure 25:
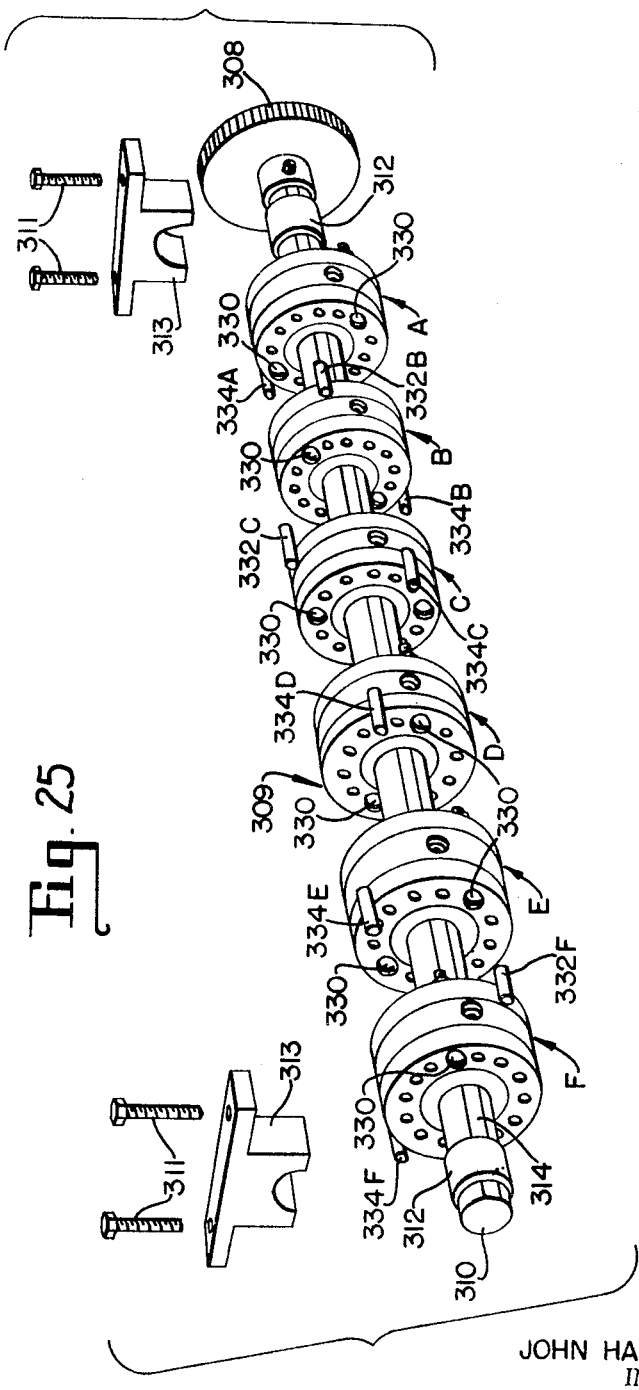

FIG. 8 is a sectional view taken on line 8—8 of FIG. 2, looking in the direction indicated by the arrows, and showing the pipe positioning "kicker" members thereon for moving the pipe transversely of the pipe positioning device, with certain portions being show in full outline and certain portions being shown in dashed outline to show the relative relation between the various mechanisms and the pipe;

FIG. 9 is a fragmentary side elevational view showing the pipe positioning device on substantially the same scale as shown in FIGS. 3 through 5, showing the relation between the pipe positioner carrier and the fluid actuated cylinder connected thereto, and showing certain "kicker" mechanism for moving the pipe transversely of the pipe positioning frame;

FIG. 10 is a view similar to FIG. 9, but of the other end portion of the pipe positioning device, showing the various cylinders which operate the pipe "kicker" mechanism for moving the pipe transversely of the pipe positioning device, and showing a fluid actuated cylinder for elevating the pipe or drill stem to enable the pipe handling elevators to be attached to the pipe or drill stem;

FIG. 11 is a fragmentary top plan view of the portion of the pipe positioning device as shown in FIG. 9;

FIG. 12 is a fragmentary top plan view of a portion of the mechanism as shown in FIG. 10, and being on the same scale;

FIG. 13 is an end elevational view of the pipe positioning device shown in full outline mounted on a pipe hauling and dispensing apparatus, showing the trailer and the drill stem or pipe thereon in dashed outline, in position to dispense pipe or drill stem onto the pipe positioning device;

FIG. 14 is a view similar to FIG. 13, but of the pipe hauling and dispensing apparatus in position to receive pipe thereonto from the pipe positioning device;

FIG. 15 is a diagrammatic view of the fluid actuated system for actuating the various component parts of the pipe positioning device;

FIG. 15A is a diagrammatic view of the motor driven, cam actuated, programming mechanism, with pilot control valves, including starting and stopping valves, which programming mechanism sequentially operates the control valves of the drill stem and pipe positioning device, the diagrammatic piping of FIG. 15A is a complementary with the piping of FIG. 15;

FIG. 16 is a diagrammatic view showing only the air actuated cylinders which operate the kicker bars to move pipe transversely onto the wheeled carriers, onto the pipe positioning device and showing the plungers of the cylinders in retracted position;

FIG. 17 is a view similar to FIG. 16, but showing the plungers in extended position;

FIG. 18 is a view similar to FIG. 16, but showing one pair of cylinders with the plungers thereof extended, and one pair of cylinders with the plungers thereof retracted so that the transverse kicker elements connected thereto will all be in retracted position;

FIG. 19 is a top plan view of the motor driven, cam actuated programming device, showing the cams and pilot operated control valves thereon, with parts broken away, with parts shown in section to bring out the detailed construction; and showing a starting valve therefor;

FIG. 20 is a side elevational view of the programming mechanism as shown in FIG. 19;

FIG. 21 is an end elevational view of the programming device as shown in FIGS. 19 and 20, showing a starting valve associated therewith;

FIG. 22 is an exploded perspective view of a cam hub and a cam plate, with cams thereon, showing the associated parts in exploded relation with respect thereto;

FIG. 23 is a sectional view taken approximately along line 23—23 of FIG. 19, looking in the direction indicated by the arrows;

FIG. 24 is a side elevational view of a three-way, manually controlled, off, on, and bleed valve; and FIG. 25 is a perspective view of a programmed cam shaft shown apart from the automated programming mechanism, showing removable clamps and bolts in exploded relation thereto.

With more detailed reference to the drawings, the numeral 1 designates generally an elongated structural frame which is adapted to be secured to the chassis 2 of a trailer designated generally by the numeral 4, by outwardly projecting sills 6.

The trailer 4 preferably has a pipe or drill stem hauling rack 8 thereon to provide a pipe hauling and dispensing apparatus as more fully set forth in the above referred to co-pending application. The rack 8 is raised and lowered relative to the chassis 2 by fluid actuated jacks 10. The fluid actuated jacks 10 may be selectively controlled to angulate the rack 8, so as to dispense pipe or drill stem 12 onto the elongated frame 1 of the pipe positioner, or the rack 8 may be so arranged as to receive pipe or drill stem from the pipe positioner, generally designated by the numeral 14, as is more fully brought out in my co-pending application, pipe hauling and dispensing apparatus, filed as of this date, the structure and operation thereof being fully set forth therein. The pipe positioner is capable of moving the pipe laterally relative to each side of the pipe positioning frame, as well as of moving the pipe longitudinally with respect thereto. With the rack 8 in an angulated position, as shown in FIG. 13, and with the upper faces of divider strips 16 located substantially level with the upper faces of outwardly extending supports 72 on frame 1, the pipe or drill stem will roll downward until the length of pipe or drill stem adjacent the pipe positioner 14 comes to rest against the outermost pipe kicker bars 20 or pipe kicker bars 22, depending upon which side of the pipe positioner 14 is receiving the pipe or drill stem from the rack 8.

While only one pipe hauling and dispensing apparatus is shown in FIG. 13, from which to dispense pipe or drill stem onto the pipe positioner 14, it is to be understood that the pipe positioner is so designed and constructed as to receive pipe from either side thereof, as shown in FIG. 8, therefore, two such pipe hauling and dispensing apparatuses may be employed; however, when two such units are used, the pipe positioner 14 is secured to only one trailer chassis 2, as by bolting or welding, the sills 6, however, will abridge to the chassis of the other trailer.

The outermost kicker bars 20 and 22 comprise substantially vertically movable bars, each of which has opposed angulated faces near the upper end thereof. These outermost pipe kicker bars 20 on one side and the bars 22 on the other side serve to initially stop the drill stem or pipe 12, when the pipe is rolling onto the pipe positioner 14 from the pipe rack 8; however, these respective pipe kicker bars 20 and 22 work in conjunction with intermediate pipe kicker bars 24 and 26, which stop the inward rolling of the pipe or drill stem 12, after the pipe has been released by the outermost pipe kicker bars 20 or 22. A third series of pipe kicker bars 28 and 30, respectively, is positioned on each side of frame 1 and inwardly from the intermediate pipe kicker bars 24 and 26.

With the first two series of pipe kicker bars 20 and 22 operated in complementary relation, the drill stem or pipe, which rolls downward from the rack 8 onto the pipe positioner 14, is moved laterally onto wheeled carriers 32 and 34 for longitudinal moment by the wheeled carriers, along a central trackway 35. When the drill stem or pipe is to be removed from the wheeled carriers 32 and 34 and directed onto pipe rack 8, a four-way valve 236 is moved into the position as shown in FIG. 18, which will move all of the kicker bars 20 and 22 downwardly, below the level of support bars 72 or 74. Pipe kicker bars 28 have angulated faces on the upper ends thereof facing in one direction, as will best be seen in FIG. 7, and as indicated at 124. The pipe kicker bars 30 each has an angulated face 126, which faces 126 are in opposed relation to angulated faces 124, as will best be seen in dotted outline in FIG. 7. With the angulated faces 124 and 126 being in opposed relation, the set of kicker bars 28 will direct the drill stem or pipe to one side of the pipe positioner 14 and onto rack 8, when moved inwardly by cylinder 165 urging plunger 162 thereof upward, which operates the associated mechanisms to move the pipe kicker bars rapidly upward to impart a blow which will direct drill stem or pipe 12 onto support bar 74, as shown in FIG. 7, thence onto divider strips 16, which strips 16 are inclined downwardly with respect to the upper surface of support bar 74, to direct drill stem or pipe 12 onto rack 8. By moving positioning valves 241 and 256 to a different position, cylinders 164 will be rendered inoperative, and the same function can be performed with cylinder 166 to direct drill stem or pipe off the opposite side of carriers 32 and 34 onto support bars 72 opposite support bars 74.

Shafts 36 and 38, respectively, are journaled in the respective bearings 37 and 39 on elongated structural frame 1. Each of the shafts 36 and 38 has a plurality of outwardly extending arms, 40 and 42, respectively, thereon at spaced longitudinal intervals, which arms are connected to the respective adjustable clevis and rod arrangements 44 and 46, each of which clevis and rod arrangements is connected to the lower end of the respective pipe kicker bars 20 and 22. Each of the shafts 36 and 38 has arms 48 and 50 respectively, to which is pivotally connected the respective plungers 52 and 54 of the respective fluid actuated cylinders 56 and 58. The respective cylinders 56 and 58 are pivotally connected to the elongated structural frame 1 by pivot pins 60 and 62, respectively as will best be seen in FIG. 8. It is preferable that these cylinders be air actuated for instant action, and that each be of the double acting type with air conduits 64 and 66 leading from cylinder 56, and air conduits 68 and 70 leading from cylinder 58, whereupon, by actuation of the plungers of the respective cylinders in timed sequence, the pipe kicker bars 20 and 22 can move the pipe laterally along the upper face of support bars, such as shown at 72 or 74.

The pipe kicker bars 20 and 22 are guided for substantially vertical movement by rollers 76 and 78, one on each side of each pipe kicker bar 20, and by rollers 80 and 82, one on each side of each pipe kicker bar 22. The pipe kicker bars 20 and 22 move from the position shown in dashed outline, FIG. 8, to the position as shown in full outline therein, upon actuation of the respective plungers 52 and 54. When the pipe kicker bars 20 and 22 are upwardly extended, as shown in dashed outline in FIG. 8, the drill stem or pipe 12, as shown in dashed outline, will be restrained against inward movement, when rolled from the pipe rack 8. However, upon retraction of pipe kicker bars 20, when pipe is being directed from pipe rack 8 onto support bars 72, the pressure exerted by the pipe rolling from rack 8 will move the drill stem or pipe 12 from the position as shown in dashed outline in FIG. 8 to the position as shown in full outline therein. Then, upon upward movement of kicker bars 20, the intermediate pipe kicker bars 24 will move downward, whereupon the angulated faces 21 of pipe kicker bars 20 will hit the pipe with such force as to direct the pipe or drill stem 12 onto wheeled carriers 32 and 34, as will be more fully brought out hereinafter. The kicker bars 22 and 26 operate in a similar manner to direct the pipe from the support bars 74 onto wheeled carriers 32 and 34, when three-way positioning valves 232 and 240 are switched to a different position to direct air into cylinders 58 and 110 instead of into cylinders 56 and 108. Pipe kicker bars 20 and 24 work in complementary relation, while pipe kicker bars 22 and 26 are inoperative, and pipe kicker bars 22 and 26 operate in complementary relation, when pipe kicker bars 20 and 24 are inoperative, as shown in FIG. 15.

Shafts 84 and 86 are journaled in the respective bearings 85 and 87 on the elongated structural frame 1, and the shaft 84 has a plurality of inwardly extending levers 88 mounted thereon and secured thereto for arcuate movement therewith. The shaft 86 has a plurality of inwardly extending levers 90 mounted thereon and secured thereto for arcuate movement therewith. The respective levers 88 and 90 are pivotally connected to the respective adjustable clevis and rod assemblies 92 and 94, which clevis and rod assemblies are adjustably connected to the lower ends of the respective intermediate pipe kicker bars 24 and 26.

Each shaft 84 and 86 has the respective levers 100 and 102 mounted thereon and secured thereto for arcuate movement therewith. Plungers 104 and 106 of the respective fluid actuated cylinders 108 and 110 are pivotally connected to the respective levers 100 and 102, with the respective cylinders 108 and 110 being pivotally connected to the elongated structural frame 1 by pivot pins 112 and 114, respectively.

The fluid actuated cylinders 108 and 110 are each, preferably, air acutated to enable quick action, when fluid pressure is applied to either end of these double acting cylinders. A conduit 116 connects with one end of the cylinder 108 and a conduit 118 is in fluid communication with the opposite end thereof. A conduit 120 is in fluid communication with one end of the cylinder 110 and a conduit 122 is in fluid communication with the opposite end thereof, which fluid conduits are so connected for selective operation as to enable the fluid actuated cylinders 108 and 110 to selectively actuate the respective intermediate pipe kicker bars 24 and 26, upon selective actuation of valve 226 and by selective positioning of valves 232 and 240, as will be more fully brought out hereinafter. The pipe kicker bars 24 and 26 are for directing pipe from rack 8 onto wheeled carriers 32 and 34.

The innermost pipe kicker bars 28 and 30, FIG. 7, have the respective upper ends thereof angulated, as indicated at 124 and 126, which kicker bars operate in substantially a vertical plane, in guided relation, between sets of rollers 128 and 130, respectively to direct drill stem or pipe from wheeled carriers 32 and 34 laterally onto support bars 72 or 74, thence to the divider strips 16 of rack 8. Each of the kicker bars 28 and 30 has a pivot pin 132 therethrough, to pivotally mount the respective links 136 at one end of each bar. Each of the kicker bars 30 has a pivot pin 134 therethrough to pivotally mount the respective links 138 at one end of each bar. The other end of the respective links 136 and 138 is pivotally attached to the respective levers 140 and 142, which levers are mounted on and secured to the respective longitudinal shafts 144 and 146, which shafts are journaled in the respective bearings 148 and 150 on elongated structural frame 1.

The respective shafts 144 and 146 have the respective levers 152 and 154 secured thereto and rotatable through an arcuate movement therewith. The distal end of each lever 152 and each lever 154 is connected to the respective clevises 156 and 158, which clevises are mounted upon the upper end of the respective plungers 160 and 162, which extend into the respective fluid cylinders 164 and 166, as shown in FIG. 6.

Each of the fluid cylinders 164 and 166 is pivotally connected, by the respective pivot pins 168 and 170, to a transverse bar 172 which extends between the lower portions of elongated structural frame 1. The cylinders 164 and 166 are fluid actuated, with cylinder 164 having conduits 174 and 176 leading from the respective ends thereof to a source of fluid supply under pressure, which is controlled by valving mechanism, as will be more fully brought out hereinafter. The hydraulic cylinder 166 has conduits 178 and 180 leading from the opposite ends thereof for actuating the cylinder by fluid pressure. The conduits 178 and 180 extend to the source of fluid supply, preferably air under pressure, which fluid is controlled by valves, as will be more fully brought out hereinafter.

Upon actuation of plungers 160 and 162, by air pressure, the respective levers 152 and 154 are moved to rotate the respective shafts 144 and 146. Upon rotation of shaft 144, levers 140 are actuated to raise and lower a plurality of innermost kicker bars 28, as links 136 interconnect the kicker bars 28 therewith. Each pipe kicker bar 28 is guided within guide rollers 128 so that the pipe kicker bars 28 will move vertically up through the respective slots 29 within trackway 35, with the angulated ends 124 thereof performing an angular kicking action to move pipe or drill stem 12 from the position as shown in dashed outline in FIG. 7 to the position as shown in full outline therein.

Upon cylinder 166 actuating plunger 162, which is connected to lever 154 by a pivot pin 159 which passes through an aperture in clevis 158 and an aperture in the distal end of lever 154, the lever 154 is moved arcuately to rotate shaft 146, which, in turn, moves a plurality of levers 142 which are pivotally attached to links 138, which links are attached to pipe kicker bars 30, which kicker bars are each journaled for vertical movement between pairs of rollers 130, which innermost pipe kicker bars 30 pass upward through slots 31 in trackway 35, which slots 31 are similar to slots 29, but are in off-set relation with respect thereto. The innermost kicker bars 30 have angulated ends 126 thereon, which are in opposed relation with respect to the angulated ends 124 on pipe kicker bars 28.

Each of the sets of innermost kicker bars 28 and 30 move through approximately the same vertical distance. Then, when in one position, the bars are retracted to a position below the upper face of trackway 35, but, when in fully extended position, they extend upward above the upper face of outwardly extending support bars 72 and 74. In this manner the drill stem or pipe 12 is moved from a position on the wheeled carriers 32 and 34, as shown in dashed outline in FIG. 7, to the position as shown in full outline in FIG. 7, and with pipe kicker bars 20 and 22 retracted so the ends thereof will be below the upper surface of support bars 72 and 74, by the movement of valve 236 to the position as shown in FIG. 18, and with the positioning valves 232 and 240 in the proper position, the pipe is ready to be moved laterally from wheeled carriers 32 and 34 onto support bars 72 or 74, depending upon the position of valves 232 and 240. Since the upward movement of the innermost pipe kicker bars 28 and 30 is with an impact, the angulated ends 124 and 126 will move the pipe or drill stem 12 laterally, either onto support bars 74 or onto support bars 72. The impact is of sufficient force, when air cylinders are used, that the pipe or drill stem 12 will roll the full length of support bars 74 or 72 and be directed onto divider strips 16, which are inclined so that the pipe will be directed onto rack 8 or onto a pipe hauling and dispensing apparatus, as shown in FIG. 14.

The wheeled carriers 32 and 34 are provided on trackway 35 for moving drill stem or pipe 12 longitudinally, either into a position to be picked up by pipe elevators of a rotary drilling rig, or to be received from the pipe elevators of a rotary drilling rig onto the wheeled carriers for subsequent transfer onto divider strips 16 of pipe racks 8 or pipe hauling and dispensing apparatus as shown in FIGS. 13 and 14.

The wheeled carrier 32 has an upstanding abutment 33 on the end thereof, which abutment is engageable with an end of pipe or drill stem 12, so upon movement of plunger 182 by air cylinder 184, the wheeled carrier will be moved longitudinally along trackway 35, upon introduction of air into conduit 186, with the air exhausting out of conduit 188, the air to and from said conduits being controlled by a valving mechanism, as will be more fully brought out hereinafter.

With the pipe being moved longitudinally along trackway 35 on wheeled carriers 32 and 34, an end of the pipe 12 will be moved to a point above roller 190, which roller has a V-shaped groove therein, as will best be seen in FIG. 3, whereupon air will be directed from air supply conduit 228 through four-way air control valve 191 into conduit 192 into the lower end of cylinder 200, to urge plunger 194 therein upward, and with the plunger 194 connected to crossbar 196, by a pivot pin 198, the roller 190 and end of pipe or drill stem 12 will be elevated by air cylinder 200, with the air being exhausted from the cylinder through conduit 202 to exhaust through valve 191 to the atmosphere.

The crossbar 196 has downwardly extending guide members 204 thereon which fit in complementary guided relation within tubular guide members 206. When the pipe 12 is lifted to the desired height, pipe elevators of the drilling rig are connected thereto, the wheeled carrier 32 supports the trailing end of the pipe or drill stem substantially the full length of trackway 35, while the pipe or drill stem is going into the well. This is repeated until sufficient pipe is run into the well to enable drilling operations to proceed.

When it is desired to remove pipe or drill stem from a well, a cable or line 208 is attached to the wheeled carrier 32 which cable or line is wound onto a spring actuated winding mechanism 210 to normally wind the cable 208 onto the reel of the spring actuated winding mechanism 210 to move the wheeled carrier 32 adjacent the drilling rig, whereupon an end of the pipe or drill stem 12 is placed upon the wheeled carrier 32 at an angle, then upon lowering the pipe elevators and drill stem or pipe, the wheeled carrier 32 is moved outward along trackway 35 to position the wheeled carrier in a position as shown in FIG. 9, in so doing the spring in spring actuated winding mechanism 210 is wound up, and after the drill stem or pipe is laid in horizontal position and the elevators removed therefrom, the innermost kicker bars 28 or 30 are actuated to move the drill stem or pipe 12 from the wheeled carriers 32 and 34 onto a support bar 74 or the support bar 72, thence it will roll onto track 8. Upon removal of pipe 12 from the wheeled carriers 32 and 34, the line or cable 208 is reeled in by spring actuated winding mechanism, which will draw the carrier 32, by spring action, along trackway 35 into close proximity to the drilling rig to enable further lengths of pipe or drill stem to be lowered thereonto.

In directing pipe or drill stem from pipe rack 8 onto the pipe positioning apparatus, it is desirable to position the pipe longitudinally so that it will be free to roll onto carrier 32 without striking upstanding abutment 33. This is accomplished by upright arms 212, which are pivotally mounted on a transverse shaft 214 mounted on the upper face of frame 1. The arms 212 extend upward and have angulated steel plates, as indicated at 216, on the upper ends thereof, which angulated plates are at a height to register with the ends of pipe being directed onto the support bars 72 and 74.

With the pipe 12 positioned on support bars 72 or 74, air under pressure, from a source of air supply, is directed from air supply conduit 228 into cylinder 220, at the end thereof opposite the plunger 222, and the air in the opposite end of cylinder 220 is directed out through conduit 219, to exhaust through an exhaust port in the valve 266, as the plunger is moved outwardly. The cylinder 220 is pivotally mounted on a pin 221 which passes through an apertured lug on the end of cylinder 220 and through downwardly extending lugs 223 on the lower side of trackway 35. The plunger 222 is pivotally connected, by a pin 224, to the upright arm 212. This causes arm 212 and angulated plates 216 to move inward toward the drilling rig and to engage the respective adjacent ends of the pipe or drill stem to move the pipe or drill stem to a predetermined position longitudinally toward the rig ahead of abutment 33, preparatory to the outermost kicker bars 20 or 22 moving the pipe or drill stem onto carriers 32 and 34 when the intermediate kicker bars 24 and 26 are in retracted position. The upstanding abutment 33 moves against the end of the pipe or drill stem 12 to move the drill stem or pipe longitudinally by the plunger 222 by air under pressure and is directed from air supply conduit 228 through three-way control valve 244 into conduit 186 to also simultaneously direct air into conduit 245 to actuate a spring loaded diaphragm valve 246 to open valve 246 to release air from the plunger end of cylinder 184 through conduit 188; simultaneously air under pressure is directed through conduit 186 to the end of air actuated cylinder 184 opposite the plunger 182 thereof to urge plunger 182 thereof outwardly. The plunger 182 has a head 181 thereon which is supported by a wheeled carrier 183.

OPERATION

To perform the various operational functions for the pipe positioning apparatus, which is preferably used in conjunction with a pipe hauling and dispensing apparatus, as shown in dashed outline in FIGS. 13 and 14, the pipe hauling and dispensing apparatus is loaded with pipe as shown in FIG. 13. The pipe hauling and dispensing apparatus is operated by jacks 10 on each corner thereof opposite the pipe positioner 14 so as to angulate the pipe rack 8 and divider strips 16 so that the divider strips 16, which will have a tendency to roll the pipe or drill stem 12 towards the pipe positioning apparatus, will be so raised so that the upper surface of a divider strip 16 will be in substantially aligned relation with the upper surface of pipe support bars 72 or 74 on the pipe positioner 14. With the pipe rolling from either side onto the pipe positioner 14, the pipe positioner is ready to perform the function of removing pipe transversely from the divider strip 16 to be directed onto the carriers 32 and 34. To accomplish this, a four-way control valve 226 is manipulated, FIG. 16, which will direct air from air supply conduit 228 into and through four-way control valve 226 into conduit 230, and with three-way positioning valve 232 in position to direct air into conduit 234, thence simultaneously into conduit 122 leading to the end of the air cylinder 110 opposite plunger 106 thereof and also into four-way switching valve 236, FIG. 16, and with the four-way switching valve 236 in position as shown in FIGS. 16 and 17 to direct air through conduit 70 into the end of air actuated cylinder 58 opposite the plunger 54 thereof, this will cause plungers 54 and 106 to be projected, FIG. 17.

Upon projecting plunger 54, which is connected to lever 50, which is mounted on and secured to shaft 38, the lever 50 and outwardly extending arm 42 are moved about the axis of shaft 38, which will move kicker bars 22 downward, which will permit the pipe or drill stem 12 to roll from the position as shown in dashed outline in FIG. 8 to the position as shown in full outline therein, with the intermediate kicker bars 26 arresting the rolling movement of pipe or drill stem 12. This will permit another length of pipe or drill stem to roll into the position, as indicated in full outline, on support bars 74. Simultaneously with the projection of plungers 54 and 106, air from cylinders 58 and 110 is discharged out through air line 68 and conduit 120. The air which is directed out through conduit 68, FIG. 17, will be directed through four-way valve 236 and into conduit 238. Simultaneously, air which is directed out of cylinder 110 through conduit 120, will also be directed into conduit 238 and with the air discharged from cylinders 58 and 110 passing out through three-way switching valve 240 into conduit 242 to be discharged to atmosphere through a port in four-way control valve 226. With the pipe or drill stem 12 in position, as shown in full outline in FIG. 8, on support bars 74, air is directed by four-way switching valve 226 into conduit 242, thence through three-way switching valve 240 into conduit 238 and simultaneously into air line 68 and conduit 120 to direct the air to the plunger ends of the respective cylinders 58 and 110 as shown in FIG. 16 to cause retraction of plungers 54 and 106 as shown in FIG. 16. The cylinder 58 will retract plunger 54 to move lever 50 and arms 42 about the axis of shaft 38. Simultaneously, air will be directed into cylinder 110 to retract plunger 106 to move lever 102 and levers 90 about the axis of shaft 86 to move kicker bars 26 downward simultaneously with the movement of kicker bars 22 upward, from the positions as shown in full outline to the positions shown in dashed outline in FIG. 8, with the air exhausting out of cylinder 58 into air line 70 and thence through four-way switching valve 236 into conduit 234. Simultaneously the air from the end of cylinder 110 opposite the plunger thereof, will be exhausted into conduit 122 and thence into conduit 234 through three-way positioning valve 232 into conduit 230 and out through an open port in four-way control valve 226 to atmosphere. In so doing the pipe 12 is moved laterally onto carriers 32 and 34 on trackway 35 which is in the central position, as shown in full outline in FIG. 8.

With the pipe or drill stem 12 positioned on carriers 32 and 34, air is directed from air supply line 228 through air control valve 244 into conduit 186 into the end of the cylinder 184 opposite the stuffing gland thereof, thence the air from cylinder 184 is exhausted out through conduit 188 through restricted flow and check valve 189 and out through four-way air actuated, diaphragm control valve 246. As the diaphragm in valve 246 is simultaneously actuated to exhaust air from the plunger end of cylinder 184 through conduit 188, upon air pressure being applied through conduit 245 to the diaphragm of air actuated control valve 246. When the desired stroke of plunger 182 has been made, the air control valve 244 is moved into position to release air from conduit 186 and conduit 245 and to close the air supply conduit 228. In so doing a spring actuated element, in the conventional four-way air actuated control valve 246, moves the mechanism within valve 246 to close the exhaust port thereof and to direct air through conduit 250, valve 246, through restricted flow and check valve 189 into conduit 188 to move plunger 182 into retracted position, as shown in FIGS. 9 and 15.

It is preferable to have an air supply tank 248 in close proximity to the air actuated mechanism to which the air supply line 228 is connected, and from which tank an air conduit 250 leads to air actuated control valve 246 to enable the valve 246 to be operated by remote control.

The direction of pipe or drill stem onto the wheeled carriers will continue in this manner until each layer of pipe or drill stem is exhausted from the divider strips 16, whereupon, the jacks 10 are elevated to bring the upper surface of the next divider strips 16 in aligned relation with the upper surface of support bars 18, and the routine, as above set out, is repeated and the same angularity of the divider strips 16 is maintained until the last layer of pipe or drill stem is unloaded from the pipe rack 8. When sufficient pipe has been dispensed from one or both sides of the pipe positioner 14, the drilling operation may be begun.

The drilling is continued until it is desired to remove the pipe from the bore hole being drilled, whereupon, valves 236 and 236*a* are moved into the position as shown in FIG. 18, whereupon air is directed from air supply conduit 228, through valve 226 through conduit 242 and through three-way switching valve 240, thence either into conduit 238 or into conduit 238*a* and through four-way switching valve 236 or through four-way switching valve 236*a* and into conduits 70 or 70*a* and into the end of cylinder 58 or into cylinder 56 opposite the respective plungers to urge the respective plungers 54 and 52 outward, which plungers are connected to kicker bars 22 and 20, respectively, through levers, arms, and shafts to retract kicker bars 20 and 22, simultaneously air is directed from conduit 238 into conduit 120 or conduit 120*a* and into cylinders 110 or 108 at the respective plunger ends thereof to retract plungers 106 and 104, which are connected to levers and shafts to retract intermediate kicker bars 26 or intermediate kicker bars 24, from the position as shown in full outline in FIG. 8 to the position shown in dashed outline therein.

The pipe form the bore hole is then elevated until it is at a sufficient height above the derrick floor so that one joint may be unscrewed. Then this joint is raised and the lower end of the pipe is placed upon the wheeled carrier 32 and said wheeled carrier moves outwardly along trackway 35 against the tension of a spring in cable winding device 210 as the cable 208 is attached to the wheeled carrier. When the pipe reaches the end of the trackway 35 against head 181 on plunger 182, the pipe or drill stem is then laid, in a prone position, on wheeled carriers 32 and 34. The pipe handling elevators are then disconnected from the pipe or drill stem 12, then by moving valve 252 into one position, air is directed from conduit 228 into conduit 254, and with directing valve 256 in one position, air pressure will be impressed upon the diaphragm 258 or 258*a* of remote control valve 260 or 260*a* which will cause the valve 260 or 260*a* to move into open position against spring tension, which will permit air to be directed from air supply tank 248, through branch pipe 262 into conduit 264 and through open control valve 260 or 260*a* into the lower end of cylinder 164 or 166; whereupon, plunger 160 or 162 is moved upward, which plungers are pivotally connected to the respective levers 152 and 154, which in turn, rotates shaft 144 or shaft 146 to move levers 140 or levers 142 upward, which respective levers are connected to pipe kicker bars 28 by links 136 and pins 132 or by links 138 and pins 134.

With respect to the operation of cylinder 164 to operate kicker bars 28, the drill stem on the wheeled carriers is shown in dashed outline, FIG. 7. Whereupon, the kicker bars 28 are moved from the position as shown in dashed outline position in FIG. 7 to the full line position shown therein, whereupon, the impact on the drill stem or pipe 12 will move it into a second position, adjacent thereto, as shown in full outline in FIG. 7, with such force that the drill stem or pipe rolls into a third position, as indicated in full outline, near the end of support bars 74, thence onto divider strips 16 into racked position on the pipe rack 8. With the pipe or drill stem being acted upon with impact force, it will be caused to roll along the upper face of support bars 74 and onto divider strips 16, which have been brought into an angulated position by jacks 10 on pipe hauling and dispensing apparatus, so that the pipe or drill stem will roll downward along divider strips 16, as indicated in FIG. 14, until each layer is complete, whereupon, by lowering the jacks 10 until the upper face of each divider strip is in register with the upper surface of support bars 74, the operation continues until the pipe hauling and dispensing apparatus is loaded with pipe or drill stem.

AUTOMATED PROGRAMMING MECHANISM

The present drill stem and pipe positioning device is readily programmed by the mechanism shown in the drawings, FIGS. 15 through 23, so all of the operations heretofore performed by hand, as shown in my co-pending application, Ser. No. 492,581, are performed automatically, in the exact same sequence, each time, in accordance with the setting of the programming cams of this mechanism.

The motor driven, cam actuated programming device is designated generally by the numeral 300, which device is mounted on a base 301, with the motor being designated at 302, which may either be electric or air driven, and is mounted thereon, the present motor is indicated as being air driven, which motor mechanism includes the necessary air conduits and motor valves to bring about the proper operation of the motor. A drive pinion 304 is secured to the end of the motor shaft 306, which pinion is engaged in mesh relation with a gear 308 mounted on cam receiving shaft 310, which cam shaft is journaled in bearings 312, which are held in place by quick removable caps 313 held in place by bolts 311. This enables the cam shaft 310 and the programmed assembly of cams thereon to be programmed for one operation, such as going in the hole, and then this cam shaft and assembly of programmed cams can be quickly removed by the removal of caps 313 and a similar cam shaft 310 with a different programming of cams can be installed to sequentially operate valves to enable the second cam shaft and assembly to perform all the operations of coming out of the hole without having to adjust any of the cam elements thereon. When the second cam shaft is fitted into place, with the gear 308 and the pinion 304 in meshed, in driving relation, with the caps 313 are bolted in place by bolts or cap screws 311. The shaft 310 is preferably flattened, as indicated at 314, so that the cam hub 316, FIG. 22, may be secured thereto by a set screw 318, with the minimum possibility of slippage.

Perforate cam discs 320 and 322 are bolted to the cam hub 316 so the bore of each cam disc, 320 and 322, will complementally fit on the shouldered portion 324 of cam hub 316. The cam hub 316 has circumferentially spaced holes 326 therein, which, in the present instance, twelve equally spaced holes are shown. The perforate cam discs each have, preferably, an equal number of holes as indicated at 328, and in the present instance, are shown to be fourteen in number, which holes are equally spaced circumferentially about the same bolt center as the holes 326 in hub 316. Bolts 330 are adapted to pass through the holes 326 and 328 so as to hold the discs in binding relation to hub 316. By having the number of holes in the perforate discs vary with respect to the holes in the hub 316, a vernier adjusting relation may be secured with the discs 320 and 322 with respect to the hub 316, which, in the present instance, gives approximately two degrees variation of adjustment of outwardly extending cam members 332 and 334. However, more minute adjustments may be had by varying the relative number of holes between the hub and the respective cam discs.

The present device is shown to have six cam hubs thereon, each with perforate discs 320 and 330 secured thereto, with outwardly extending pins 332 and 334 secured thereto for adjustment throughout the circumference of the respective hubs. The composite assembled cams are designated generally at A, B, C, D, E, and F. The cam A has an outwardly extending pin 334A on the perforate disc thereof, which pin engages a pilot valve actuator member 336 on a pilot valve 338. The pilot valve 338 is a three-way valve which directs air from air supply line 228A into and through pilot control valve 338, when the valve is opened by cam 334A, and directs air into an end of a valve 340 which supplies air to motor 302. This will cause a conventional pressure actuated spool element therein (not shown) to shift the valve 340 into closed position, and, at the same time, air is bled from the three-way pilot control valve 338. With the valve 340 in this position, and with valve 344 open, the programming device is ready to operate.

To initially start the motor 302, a button 346 on three-way control valve 348 is depressed against the tension of a spring, whereupon, air is momentarily directed from air supply line 228B, whereupon, air will flow through manually operated starting valve 348 into line 350 to move a valve element in motor control valve 340 to open position, then, upon release of button 346, air will be bled from air line 350 and valve 348. The motor 302 operates in clock-wise direction, facing the end of cam shaft 310, which will move the outwardly extending cam 334A until the pilot valve actuator member 336 is disengaged from cam member 334A, whereupon, the motor will continue to rotate shaft 310 slowly and in geared relation, so as to cause cam member 332D to come into engagement with pilot valve actuator member 352 and with the valve 354 open, air will be directed from air supply line 228B through air line 356, through pilot actuator valve 358 to one end of four-way control valve 226, whereupon, air will be directed through air line 242 to piston rod end of cylinder 58 to actuate plunger 54 to move pipe kicker bars 22 upward to the position as shown in dashed outline in FIG. 8.

Simultaneously, air is directed into the end of cylinder 110 opposite the piston rod to move pipe kicker bars 26 downward from the full line position to the dashed-line position, as shown in FIG. 8. With kicker bars 22 in this position, and with the pipe or drill stem hauling rack 8 angulated to the position as shown in FIG. 13, pipe or drill stem 12 will roll onto the support bars 74, as indicated in dashed outline in FIG. 8. The drill stem or pipe will roll against kicker bar 22 and will be maintained in this position until the programming device rotates the cam member D until the cam projection 334D engages pilot valve actuator member 336D. In so doing, air will be directed from air supply line 228A through air line 360, valve 362, and into pilot control valve 364, which is a three-way valve with a bleed orifice therein. Air will be directed into air line 366 to the opposite end of valve 226 from air line 356, and since the air pressure from pilot valve 358, upon initially moving valve element in valve 226, bleeds air therefrom, air pressure is exerted on the opposite end of the pressure actuating member (not shown) in valve 226, the valve element therein is moved to a position to direct air from air line 228 into air line 368 leading to and through four-way air control valve into air lines 230, 234, and 70 to urge plunger 54 outwardly to urge plunger 22 downwardly and simultaneously, air under pressure will be directed into air line 122 to the end of air cylinder 110 opposite plunger 106 thereof, which will urge the plunger 106 outward, which plunger is connected through lever 102 on shaft 86, levers 90 are positioned thereon and are connected to kicker bars 26 which will urge kicker bars 26 upward to permit drill stem or pipe 12 to roll thereagainst. Whereupon, on the next rotation of the cam assembly D, the kicker bars 22 will be urged upward by air cylinder 58 from the full outline position, shown in FIG. 8, to the dashed outline position shown therein, and the kicker bars 26 will be simultaneously retracted to the dashed outline position, whereupon, the drill stem or pipe will be kicked by the inner angulated faces of kicker bars 22 onto the wheeled carriers 32 and 34.

Prior to the movement of the drill stem onto the wheeled carriers 32 and 34, cam assembly C will rotate projection 332C into engagement with pilot valve actuator member 372, which will direct air from air supply line 228B, through air supply line 374 through manually operated three-way, off, on and bleed valve 376, through 3-way pilot control valve 370 to four-way, remotely controlled, pressure actuated valve 266 to move a valve element therein (not shown) so as to direct air from air supply line 228, through air line 278 to and through four-way air control valve 266 to the end of air actuated cylinder 220 opposite the plunger 222 thereof, so as to project the plunger 222 to cause the plunger to move pivoted lever 212 and plates 216 against an end of the drill stem 12, so as to permit the drill stem to roll onto the wheeled carrier 32 into a position ahead of abutment 33.

Cam projection 334C may be so positioned as to immediately engage pilot valve actuator lever 380 of pilot actuator valve 382, so as to direct air from air supply line 228A into and through air line 384, through manually operated off, on, and bleed valve 386 to and through three-way off, on, and bleed pilot actuator valve 382 into air line 388 into the end of four-way, remotely controlled, pressure actuated valve 266 opposite air line 374. This will move a valve element therein (not shown) to direct air into air line 219 to retract plunger 222 and plates 216.

Upon the drill stem or pipe 12 being positioned on wheeled carriers 32 and 34, cam assembly B rotates cam projection 332B into engagement with pilot valve actuator member 390 on valve 392, in so doing, air is directed from air supply line 228B through air line 394 to and through off, on, and bleed valve 396 to and through pilot valve 392 to one end of three-way, remotely controlled, pressure actuated, control valve 244 to move a valve element therein (not shown), so as to direct air from air supply line 228 into air line 186 to the end of the cylinder 184 opposite plunger 182 thereof, and simultaneously, impress pressure through air line 245 on a pressure actuated valve 246 to permit air to escape from the opposite end of the cylinder through air line 188, and through check and restricted flow valve 189 to be vented to atmosphere by a valve 246.

Upon directing air through line 186 into air cylinder 184, the plunger 182, which is a relatively long plunger, will urge the abutment 181 into engagement with wheeled carrier 32 which supports the end of the drill stem or pipe, whereupon, the plunger 182 will move the drill stem or pipe longitudinally along track-way 14 until the end of the drill stem or pipe 12, next to the drilling rig, is moved onto a V-type roller 190. At this point, the cam assembly B moves cam projection 334B into engagement with pilot valve actuator member 397 to cause pilot actuator valve 398, which is a three-way, on, off, and bleed valve, to open a passage therein to direct air from air supply line 228 into air line 400 through manually operated, off, on, and bleed valve 402, through pilot valve 398 into air line 404 to the end of three-way, air actuated control valve 244 opposite air line 394. This will move a valve element (not shown) in valve 244 to a position to close off the air from air supply line 228, and connect a bleed port therein with air line 186, which will release pressure on air actuated valve 246, which valve will be moved, by a spring element therein (not shown) to direct air from air supply tank 248 into air line 250 to direct air through remotely controlled, three-way air valve 246, through restrictions of restricted check and flow valve 189 into the cylinder 184 at the end thereof adjacent plunger 182, which will retract abutment 181, which completes the cycle with respect to cylinder 184.

With the drill stem or pipe 12 resting on V-type roller 190 in this position, the cam assembly F rotates until the cam projection 332F thereon engages an outwardly extending valve actuator member 406 on pilot actuator valve 408, which is a three-way, off-on and bleed valve, and with the valve open, air is directed from air supply line 228B into air supply line 410 and through manually operated, three-way, off, on and bleed valve 412, into and through pilot valve 408 to an end of four-way, pressure actuated, remotely controlled valve 191 to move a valve element therein (not shown), so as to open a passage therethrough so air is directed from air supply line 228, through air line 414, into air line 192 and into the cylinder 200 on the end of the cylinder opposite the plunger 194 thereof, whereupon, the plunger lifts frame 196, on which V-type roller 190 is mounted, to elevate the drill stem or pipe, to enable pipe handling elevators of the drilling rig to be connected thereto. As the drill stem or pipe 12 is moved upward, the wheeled carrier 32 supports the end of the drill stem or pipe until it is raised clear of the track-way 14. With the drill stem or pipe 12 lifted clear of the track-way 14, the cam assembly F rotates until the cam projection 334F engages actuator arm 413, which engages the projection 334D on cam assembly F, whereupon, air from air supply line 228 is directed into air line 415A to and through manually controlled, three-way, off, on, and bleed valve 415B and into air line 415C into the end of four-way, remotely controlled valve 191, opposite the end thereof to which air line 410 is connected. This will shift a valve element (not shown) within valve 191 to direct air from air line 192 to atmosphere, and direct air into air line 202 to retract the plunger 194, which completes the steps of automation of handling the drill stem or pipe, while going in the hole with drill stem or pipe, with the present programming device.

Various cam projections, prefixed by the numerals 332 and 334, together with the assemblies designated A through F, have been shown on each cam assembly, however, the positioning of these cam projections are not necessarily in the particular location they would occupy in actual operation, as it is possible that two or more operations take place simultaneously, therefore, these projections, as shown, are for purposes of illustration, and the location of the projections can be correctly timed and put on a cam shaft assembly, such as shown in FIG. 25, which may be easily inserted into the programming mechanism and removed therefrom, by removal of bearing retainer caps 313. The sequence of timing will not need to be worked out but once, and since the above programming is with reference to going into the hole, this cam shaft assembly, as shown in FIG. 25, can be removed and another cam shaft assembly programmed for the removal of drill stem or pipe from the bore hole.

It is to be pointed out that a manually operated three-way, off, on, and bleed valve is positioned between each trunk air supply line 228A or 228B and the respective cam actuated pilot valves. In this manner, any particular operation may be omitted, if this step in the cycle of operation is not needed. Furthermore, a three-way, manually operated, by-pass valves 416A, 416B, 416C, 416D, 416E, and 416F, 418B, 418C, 418D, 418E, and 418F are provided in by-pass relation to the cam actuated pilot valves, which are actuated by the various cam projections on cam assemblies A, B, C, D, E, and F, thereby to enable any particular operation to be manually performed by manipulation of the particular by-pass valves desired.

Since certain operational functions are not performed, when coming out of the hole with drill stem or pipe which are not performed when going into the hole, it is desirable to remove the cam shaft assembly, designated generally at 309, and to replace same with a similar cam shaft assembly, but with the cam projections thereof programmed to perform different operational functions, as required in coming out of the bore hole with drill stem or pipe.

To remove the drill stem or pipe from the bore hole, after the joint suspended by the elevators is disconnected, the lower end of the drill stem or pipe is placed on the wheeled carrier 32, to which a spring loaded line 208 is attached, whereupon, the drill steam or pipe 12 is moved along trackway 14 until it is laid in prone position on wheeled carriers 32 and 34. With the drill stem or pipe in this position, and with the air closed off from all the pilot valves not to be used, and with cam 334 engaging pilot actuator member 336 to open the air supply line 228 to direct air to and through cam actuated pilot valve 338, which is a three-way, on, off, and bleed valve, air will be directed into air line 339 into an end of three-way, air actuated motor control valve 340. Whereupon, a movable valve element in motor control valve 340 (not shown), moves to close the air passage between air supply line 228A and valve 340. Upon moving the valve element within valve 340 to closed position, the air pressure in air line 339 and in the chamber of valve 340 is bled therefrom, so that the valve will remain in closed position until a manually operated valve actuator or push button 346 is moved to direct air from air supply line 228B through three-way, on, off, and bleed valve 348 into air line 350, whereupon, the air is directed to the end of the valve 340 opposite air line 339, which will move a valve element therein (not shown) into a position to open a passage in the valve 340, so the air will be directed from air supply line 228A through air line 341 into an air line 341A into manually operated, four-way valve 341B, which will direct air through conduit 341C into the motor 302 to rotate the motor in one direction, or the air is directed into conduit 341D to rotate the motor in the opposite direction.

Upon depressing valve actuator 346, the motor 302 will rotate cam assembly A, preferably in a clockwise direction, until the pilot valve actuator member 336 is disengaged from cam projection 334A on cam assembly A, the cam valve actuator assemblies B, C, D, and F are rendered inoperative by the manually operated cut-off valves being closed between the air supply lines and the cam actuated pilot valves. This will normally leave cam assemblies A and E operable. Whereupon, with the motor 302 rotating, a pilot valve actuator member 420 is engaged by an outwardly projecting cam member 332E, which opens a passage in valve 422 to direct tir from air supply line 228B through a manually operated, three-way, off-on-bleed valve 426, through an open passage in valve 422 into air line 428 into the end of pressure actuated, remotely controlled, four-way valve 252. This will move a valve element therein (not shown) to a position to direct air from air supply line 228 into air line 430 and through an open port in valve 252 into air line 254, through three-way switching valve 256 to diaphragm 258 to actuate a pressure actuated valve 260, which valve is an off-on-bleed valve, this will open a port therein to direct air therethrough, under pressure, from storage tank 248 into air lines 262 and 264, through valve 260 into air line 174 and into cylinder 164 into the end thereof opposite the plunger 160. The plunger 160 moves lever 152 to rotate shaft 154, and move lever 140 to move linkage 136 upward, which linkage is pivotally connected to a kicker bar 28, with the angulated face 124 thereon in position to deliver an impact blow to the drill stem or pipe 12 to move it from a position shown in dashed outline in FIG. 7 to the position as shown in full outline therein. Whereupon, the drill stem or pipe 12 will roll along the upper face of the support bars 74 and onto spacer strips 16 and onto the pipe hauling and dispensing apparatus 4, in a manner set out above.

Upon the cam assembly E continuing to rotate, cam projection 334E will contact pilot valve actuator member 431, whereupon an air passage in three-way, pilot control valve 432 will be opened to direct air from air supply line 228 into air line 434 and into and through manually operated, three-way, off-on-bleed valve 436, thence through pilot control valve 432 into air line 438 and into the end of four-way, remotely controlled, pressure actuated, control valve 252. Whereupon, a movable valve element in control valve 252 (not shown) is moved to open a passage in valve 252 so as to direct air from air line 430 into air line 176 into the end of the cylinder in which the plunger 160 is located, which will cause plunger 160 to be retracted, with the air exhausting out through air line 174 and to atmosphere, through valve 260, as, when the pressure on valve 260 is released, a spring associated with valve 260 opens a part to direct air from air line 174 to atmosphere.

Normally, no intermediate kicker bars are needed to move the pipe from the wheeled carriers 32 and 34 onto the pipe hauling and dispensing apparatus, however, if such intermediate kicker bar or bars are needed, the air cylinder 110 or cylinders 110 and 58 may be programmed on cam assembly D, so as to sequentially operate these intermediate kicker bars, after kicker bars 28 have been operated. This programming takes place by adjusting the cam discs relative to the cam hub, as shown in FIG. 22, so as to sequentially operate, upon the rotation of cam assembly E.

Having thus clearly shown and described the invention, what is claimed as new, and desired to be secured by Letters Patent is:

1. An automated pipe positioning device, which device comprises:
   (a) an elongated frame,
   (b) a trackway positioned longitudinally on said elongated frame, along the upper surface thereof,
   (c) two pairs of longitudinally spaced apart, innermost, upright kicker bars being associated with said elongated frame, with at least a portion of each said innermost, upright kicker bar lying between vertical planes co-extensive with the outer confines of said longitudinal trackway,
   (d) each bar of each pair of said innermost, upright kicker bars having the outer side thereof lying outwardly from a vertical, medial plane which passes longitudinally through said trackway,
      (1) each said kicker bar having an angulated upper face thereon which slopes downwardly and outwardly, with angulated faces of the respective pairs of said innermost kicker bars will be in opposed relation, to direct pipe laterally outward,
      (2) said longitudinally spaced apart, upright innermost kicker bars being adapted to be moved to a position below a horizontal plane which is co-extensive with the upper surface of said trackway, when said kicker bars are in one position,
   (e) support bars mounted on said elongated frame near the upper surface thereof and extending laterally outward therefrom,
   (f) two pairs of longitudinally spaced apart, outermost, upright kicker bars, the bars of each pair of said outermost, upright kicker bars being associated with said frame intermediate the length of said laterally extending support bars, a spaced distance outward from said trackway and lying in an upright plane approximately parallel thereto,
   (g) each bar of said pairs of outermost kicker bars having angulated faces near the upper end thereof, one of which faces slopes downwardly and inwardly, a second of which faces, on each said kicker bar, slopes downwardly and outwardly,
   (h) air actuator means associated with said frame and with each said pair of longitudinally spaced apart pairs of kicker bars to selectively and simultaneously move each pair of said kicker bars in an upright plane, independently of the other pairs of said kicker bars,
      (1) air lines connected to said air actuator means,
   (i) rotatable cam means,
   (j) control valve means within said air lines and being operatively associated with said rotatable cam means,
      (1) said air actuator means being adapted to selectively operate pairs of said longitudinally spaced apart kicker bars on said frame to move pipe laterally, in a predetermined direction, with respect to said elongated frame, upon rotation of said rotatable cam means to selectively actuate said control valve means,
   (k) a wheeled carriage movably mounted on said longitudinal trackway,
   (l) air actuated power means associated with said elongated frame and with said wheeled carriage to selectively move said wheeled carriage longitudinally on said trackway, and
   (m) further valve control means interconnected with said air actuated power means and being remote from said frame, to selectively move said wheeled carriage to move pipe longitudinally on said frame.

2. An automatic pipe positioning device, as defined in claim 1; wherein:
   (a) said air actuated means is adapted to selectively operate a plurality of pairs of longitudinally spaced apart kicker bars on said frame, with certain pairs of said kicker bars being adapted to be moved longitudinally in an upright plane in one direction, simultaneously with the movement of the other of said pairs of kicker bars in the opposite direction, to move pipe laterally, in a predetermined direction with respect to said elongated frame, upon rotation of said rotatable cam means to actuate said control valve means.

3. An automated pipe positioning device as defined in claim 1; wherein:
   (a) said air actuator means to selectively operate said longitudinally spaced apart kicker bars on said frame to move said pipe laterally in a predetermined direction being a fluid actuated cylinder.

4. An automatic pipe positioning device, which device comprises;
   (a) an elongated frame,
   (b) a trackway positioned longitudinally on said elongated frame, along the upper surface thereof,
   (c) two pairs of longitudinally spaced apart, innermost, upright kicker bars being associated with said elongated frame, with at least a portion of each said innermost, upright kicker bar lying between vertical planes co-extensive with the outer confines of said longitudinal trackway,
   (d) each bar of each pair of said innermost, upright kicker bars having the outer side thereof lying outwardly from a vertical, medial plane which passes longitudinally through said trackway,
      (1) each said kicker bar having an angulated upper face thereon which slopes downwardly and outwardly, with angulated faces of the respective pairs of said innermost kicker bars will be in opposed relation, to direct pipe laterally outward,
      (2) said longitudinally spaced apart, upright innermost kicker bars being adapted to be moved to a position below a horizontal plane which is co-extensive with the upper surface of said trackway, when said kicker bars are in one position,
   (e) support bars mounted on said elongated frame near the upper surface thereof and extending laterally outward therefrom,
   (f) two pairs of longitudinally spaced apart, outermost, upright kicker bars, the bars of each pair of said outermost, upright kicker bars being associated with said frame intermediate the length of said laterally extending support bars, a spaced distance outward from said trackway and lying in an upright plane approximately parallel thereto,
   (g) each bar of said pairs of outermost kicker bars having angulated faces near the upper end thereof, one of which faces slopes downwardly and inwardly, a second of which faces, on each said kicker bar, slopes downwardly and outwardly, (h) air actuator means associated with said frame and with each said pair of longitudinally spaced apart pairs of kicker bars to selectively and simultaneously move each pair of said kicker bars in an upright plane, independently of the other pairs of said kicker bars, (1) air lines connected to said air actuator means, (i) rotatable cam means, (j) control valve means within said air lines and being operatively associated with said rotatable cam means, (1) said air actuator means being adapted to selectively operate pairs of said longitudinally spaced apart kicker bars on said frame to move pipe laterally, in a predetermined direction, with respect to said elongated frame, upon rotation of said rotatable cam means to selectively actuate said control valve means, (k) a wheeled carriage movably mounted on said longitudinal trackway, (l) air actuated power means associated with said elongated frame and with said wheeled carriage to selectively move said wheeled carriage longitudinally on said trackway, (1) certain of said control valve means, within said air lines, being operatively associated with said rotatable cam means to actuate said air actuated power means to selectively move said wheeled carriage longitudinally of said trackway, upon rotation of said rotatable cam means, (2) certain of said air lines being connected to said air actuated power means, and (m) further valve control means interconnected with said air actuated power means and being remote from said frame, to selectively move said wheeled carriage to move pipe longitudinally on said frame.

5. An automated pipe positioning device as defined in claim 4; wherein:

(a) a fluid actuated cylinder is mounted in an upright position on said elongated frame, (b) a roller is associated with the upper end of said fluid actuated, upright cylinder, (c) certain of said air lines being connected to said upright cylinder, (d) certain of said control valve means being positioned within said air lines, and (e) said rotatable cam means adapted to selectively actuate said control valve means to selectively raise said roller in programmed sequence with respect to the operation of said fluid actuated power means to move said wheeled carriage outwardly.

6. An automated pipe positioning device as defined in claim 4; wherein:

(a) said air actuated power means for moving said wheeled carriage is a fluid actuated cylinder.

7. An automated pipe positioning device, which device comprises:

(a) an elongated frame, (b) a trackway positioned longitudinally on said elongated frame, along the upper surface thereof, (c) two pairs of longitudinally spaced apart, innermost, upright kicker bars being associated with said elongated frame, with at least a portion of each said innermost, upright kicker bar lying between vertical planes co-extensive with the outer confines of said longitudinal trackway, (d) each bar of each pair of said innermost, upright kicker bars having the outer side thereof lying outwardly from a vertical, medial plane which passes longitudinally through said trackway, (1) each said kicker bar having an angulated upper face thereon which slopes downwardly and outwardly, with angulated faces of the respective pairs of said innermost kicker bars will be in opposed relation, to direct pipe laterally outward, (2) said longitudinally spaced apart, upright innermost kicker bars being adapted to be moved to a position below a horizontal plane which is co-extensive with the upper surface of said trackway, when said kicker bars are in one position, (e) support bars mounted on said elongated frame near the upper surface thereof and extending laterally outward therefrom, (f) two pairs of longitudinally spaced apart, outermost, upright kicker bars, the bars of each pair of said outermost, upright kicker bars being associated with said frame intermediate the length of said laterally extending support bars, a spaced distance outward from said trackway and lying in an upright plane approximately parallel thereto, (g) each bar of said pairs of outermost kicker bars having angulated faces near the upper end thereof, one of which faces slopes downwardly and inwardly, a second of which faces, on each said kicker bar, slopes downwardly and outwardly, (h) air actuator means associated with said frame and with each said pair of longitudinally spaced apart pairs of kicker bars to selectively and simultaneously move each pair of said kicker bars in an upright plane, independently of the other pairs of said kicker bars, (1) air lines connected to said air actuator means, (i) rotatable cam means, (j) control valve means within said air lines and being operatively associated with said rotatable cam means, (1) said air actuator means being adapted to selectively operate pairs of said longitudinally spaced apart kicker bars on said frame to move pipe laterally, in a predetermined direction, with respect to said elongated frame, upon rotation of said rotatable cam means to selectively actuate said control valve means, (k) a wheeled carriage movably mounted on said longitudinal trackway, (l) air actuated power means associated with said elongated frame and with said wheeled carriage to selectively move said wheeled carriage longitudinally on said trackway, (m) further valve control means interconnect with said air actuated power means and being remote from said frame, to selectively move said wheeled carriage to move pipe longitudinally on said frame, (n) a movable plate means is associated with said elongated frame to pre-position a pipe longitudinally with respect to said trackway, at a predetermined location on said elongated frame, to enable the pipe to be directed laterally with respect to said elongated frame;

(1) a fluid actuated cylinder connected to said movable plate means to selectively move said movable plate means, (o) certain of said air lines being connected to said fluid actuated cylinder, which cylinder is connected to said movable plate means, and (p) certain of said control valves in said air lines leading to said fluid actuated cylinder being operably associated with said rotatable cam means, so, upon rotation of said rotatable cam means to selectively actuate said control valve means, said air actuated cylinder will be actuated to actuate said movable plate means.

8. An automated pipe positioning device, which device comprises;

(a) an elongated frame, (b) a trackway positioned longitudinally on said elongated frame, along the upper surace thereof, (c) two pairs of longitudinally spaced apart, innermost, upright kicker bars being associated with said elongated frame, with at least a portion of each said innermost, upright kicker bar lying between vertical planes co-extensive with the outer confines of said longitudinal trackway,
(d) each bar of each pair of said innermost, upright kicker bars having the outer side thereof lying outwardly from a vertical medial plane which passes longitudinally through said trackway.
  (1) each said kicker bar having an angulated upper face thereon which slopes downwardly and outwardly, with angulated faces of the respective pairs of said innermost kicker bars will be in opposed relation, to direct pipe laterally outward,
  (2) said longitudinally spaced apart, upright innermost kicker bars being adapted to be moved to a position below a horizontal plane which is co-extensive with the upper surface of said trackway, when said kicker bars are in one position,
(e) support bars mounted on said elongated frame near the upper surface thereof and extending laterally outward therefrom,
(f) two pairs of longitudinally spaced apart, outermost, upright kicker bars, the bars of each pair of said outermost, upright kicker bars being associated with said frame intermediate the length of said laterally extending support bars, a spaced distance outward from said trackway and lying in an upright plane approximately parallel thereto,
(g) each bar of said pairs of outermost kicker bars having angulated faces near the upper end thereof, one of which faces slopes downwardly and inwardly, a second of which faces, on each said kicker bar, slopes downwardly and outwardly,
(h) air actuator means associated with said frame and with each said pair of longitudinally spaced apart pairs of kicker bars to selectively and simultaneously move each pair of said kicker bars in an upright plane, independently of the other pairs of said kicker bars,
  (1) air lines connected to said air actuator means,
(i) rotatable cam means,
(j) control valve means within said air lines and being operatively associated with said rotatable cam means,
  (1) said air actuator means being adapted to selectively operate pairs of said longitudinally spaced apart kicker bars on said frame to move pipe laterally, in a predetermined direction, with respect to said elongated frame, upon rotation of said rotatable cam means to selectively actuate said control valve means, (k) a wheeled carriage movably mounted on said longitudinal trackway,
(l) air actuated power means associated with said elongated frame and with said wheeled carriage to selectively move said wheeled carriage longitudinally on said trackway,
(m) further valve control means interconnected with said air actuated power means and being remote from said frame, to selectively move said wheeled carriage to move pipe longitudinally on said frame,
(n) an air motor is connected in driving relation with the shaft of said rotatable cam means,
(o) said rotatable cam means including the shaft having a plurality of rotatable cams mounted thereon, being rotatable by said motor,
  (1) the projections of said cams being selectively adjustable around the periphery thereof with respect to said cam shaft,
(p) a second control valve, which has air passages formed therein, which air passages may be selectively opened and closed,
(q) at least one of said cam projections on each said cam being engageable with said first mentioned control valve means to direct air to said second control valve to close a passage therein, which control valve is positioned within said air line which leads to said motor, the closing of said second control valve renders said motor inoperative, and
(r) a manually controlled valve associated in bypass relation with said first control valve means.

References Cited

UNITED STATES PATENTS

| | | | |
|---|---|---|---|
| 2,563,765 | 8/1951 | Wedeberg | 74—568 X |
| 2,763,236 | 9/1956 | Cummings | 214—1 |
| 2,946,346 | 7/1960 | Mead | 137—624.17 X |
| 2,977,276 | 3/1961 | Colliva | 214—1 X |
| 3,315,822 | 4/1967 | Wilson | 214—1 X |

FOREIGN PATENTS 566,322  12/1944  Great Britain.

GERALD M. FORLENZA, Primary Examiner

F. E. WERNER, Assistant Examiner

U.S. Cl. X.R.

137—624.17